(12) United States Patent
Gebald et al.

(10) Patent No.: US 10,279,306 B2
(45) Date of Patent: May 7, 2019

(54) STEAM ASSISTED VACUUM DESORPTION PROCESS FOR CARBON DIOXIDE CAPTURE

(71) Applicant: CLIMEWORKS AG, Zurich (CH)

(72) Inventors: Christoph Gebald, Zurich (CH); Nicolas Repond, Zurich (CH); Jan Andre Wurzbacher, Zurich (CH)

(73) Assignee: CLIMEWORKS AG, Zurich (CH)

( * ) Notice: Subject to any disclaimer, the term of this patent is extended or adjusted under 35 U.S.C. 154(b) by 80 days.

(21) Appl. No.: 15/324,775

(22) PCT Filed: Jun. 30, 2015

(86) PCT No.: PCT/EP2015/064791
§ 371 (c)(1),
(2) Date: Jan. 9, 2017

(87) PCT Pub. No.: WO2016/005226
PCT Pub. Date: Jan. 14, 2016

(65) Prior Publication Data
US 2017/0203249 A1  Jul. 20, 2017

(30) Foreign Application Priority Data
Jul. 10, 2014  (EP) .................................... 14176454

(51) Int. Cl.
*B01D 53/04*  (2006.01)
*B01D 53/62*  (2006.01)
(Continued)

(52) U.S. Cl.
CPC ..... *B01D 53/0476* (2013.01); *B01D 53/0438* (2013.01); *B01D 53/62* (2013.01);
(Continued)

(58) Field of Classification Search
CPC ............ B01D 53/0438; B01D 53/0476; B01D 2253/206; B01D 2256/22; B01D 2257/504; B01D 2259/4009
(Continued)

(56) References Cited

U.S. PATENT DOCUMENTS 1,129,543 A    2/1915  Betulander
5,061,455 A *  10/1991 Brose ..................... B01D 53/04
                                                    423/228
(Continued)

FOREIGN PATENT DOCUMENTS

EP    1 142 623 A2    10/2001
EP    2 465 596 A1    6/2012
(Continued)

OTHER PUBLICATIONS

Written Opinion of the International Searching Authority of PCT/EP2015/064791 dated Aug. 17, 2015.
(Continued)

*Primary Examiner* — Frank M Lawrence, Jr.
(74) *Attorney, Agent, or Firm* — Sughrue Mion, PLLC

(57) ABSTRACT

A method for separating gaseous carbon dioxide from a mixture by cyclic adsorption/desorption using a unit containing an adsorber structure with sorbent material, wherein the method comprises the following steps: (a) contacting said mixture with the sorbent material to allow said gaseous carbon dioxide to adsorb under ambient conditions; (b) evacuating said unit to a pressure in the range of 20-400 $mbar_{abs}$ and heating said sorbent material to a temperature in the range of 80-130° C.; and (c) re-pressurization of the unit to ambient atmospheric pressure conditions and actively cooling the sorbent material to a temperature larger or equal to ambient temperature; wherein in step (b) steam is injected into the unit to flow-through and contact the sorbent material (Continued)

under saturated steam conditions, and wherein the molar ratio of steam that is injected to the gaseous carbon dioxide released is less than 20:1.

27 Claims, 8 Drawing Sheets

(51) Int. Cl.
  *B01D 53/047* (2006.01)
  *B01D 53/26* (2006.01)
(52) U.S. Cl.
  CPC ...... *B01D 53/265* (2013.01); *B01D 2253/202* (2013.01); *B01D 2253/206* (2013.01); *B01D 2256/22* (2013.01); *B01D 2257/504* (2013.01); *B01D 2257/80* (2013.01); *B01D 2258/0283* (2013.01); *B01D 2258/06* (2013.01); *B01D 2259/4005* (2013.01); *B01D 2259/4009* (2013.01); *Y02A 50/2342* (2018.01); *Y02C 10/04* (2013.01); *Y02C 10/08* (2013.01)
(58) Field of Classification Search
  USPC ........ 95/96, 97, 106, 114, 115, 139; 96/121, 96/126, 130
  See application file for complete search history.

(56) References Cited

U.S. PATENT DOCUMENTS

| | | |
|---|---|---|
| 5,540,758 A | 7/1996 | Agrawal et al. |
| 7,285,154 B2 | 10/2007 | Karwacki, Jr. et al. |
| 7,712,605 B2 * | 5/2010 | Suzuki ................. F17C 11/005 165/104.12 |
| 8,163,066 B2 | 4/2012 | Eisenberger |
| 8,500,854 B1 * | 8/2013 | Pennline ............ B01D 53/0462 95/117 |
| 2009/0120288 A1 | 5/2009 | Lackner et al. |
| 2010/0251887 A1 | 10/2010 | Jain |
| 2010/0300287 A1 * | 12/2010 | Aines ................ B01D 53/1425 95/92 |
| 2012/0074779 A1 | 3/2012 | Black et al. |
| 2012/0125194 A1 * | 5/2012 | Caram ................. B01D 53/04 95/41 |
| 2012/0174778 A1 | 7/2012 | Eisenberger |

FOREIGN PATENT DOCUMENTS

| | | |
|---|---|---|
| FR | 2 999 448 A1 | 6/2014 |
| GB | 1 296 889 A | 11/1972 |
| WO | 2010/022339 A2 | 2/2010 |
| WO | 2010/091831 A1 | 8/2010 |
| WO | 2011/137398 A1 | 11/2011 |
| WO | 2012/168346 A1 | 12/2012 |
| WO | 2014/012966 A1 | 1/2014 |
| WO | 2014/073004 A2 | 5/2014 |
| WO | 2014/170184 A1 | 10/2014 |

OTHER PUBLICATIONS

International Search Report of PCT/EP2015/064791 dated Aug. 17, 2015.
International Preliminary Report on Patentability issued from the International Bureau in counterpart International Application No. PCT/EP2015/064791, dated Jan. 10, 2017.

* cited by examiner

STEAM ASSISTED VACUUM DESORPTION PROCESS FOR CARBON DIOXIDE CAPTURE

CROSS REFERENCE TO RELATED APPLICATIONS

This application is a National Stage of International Application No. PCT/EP2015/064791 filed Jun. 30, 2015, claiming priority based on European Patent Application No. 14176454.8 filed Jul. 10, 2014, the contents of all of which are incorporated herein by reference in their entirety.

TECHNICAL FIELD

The present invention relates to desorption methods in adsorption-desorption cycles for gas separation processes and the use of such methods, for example for the separation/capture of $CO_2$ from gas streams.

PRIOR ART

Gas separation by adsorption has many different applications in industry, for example removing a specific component from a gas stream, where the desired product can either be the component removed from the stream, the remaining depleted stream, or both. Thereby both, trace components as well as major components of the gas stream can be targeted by the adsorption process. One important application is capturing carbon dioxide ($CO_2$) from gas streams, e.g., from flue gases, exhaust gases, industrial waste gases, or atmospheric air. Capturing $CO_2$ directly from the atmosphere, referred to as direct air capture (DAC), is one of several means of mitigating anthropogenic greenhouse gas emissions and has attractive economic perspectives as a non-fossil, location-independent $CO_2$ source for the commodity market and for the production of synthetic fuels. The specific advantages of $CO_2$ capture from the atmosphere include: (i) DAC can address the emissions of distributed sources (e.g. cars, planes), which account for a large portion of the worldwide greenhouse gas emissions and can currently not be captured at the site of emission in an economically feasible way; (ii) DAC can address emissions from the past and can therefore create truly negative emissions; (iii) DAC systems do not need to be attached to the source of emission but are rather location independent and can for example be located at the site of further $CO_2$ processing; and (iv) if $CO_2$ that was captured from the atmosphere is used for the production of synthetic hydrocarbon fuels from renewable energy sources, truly non-fossil fuels for the transportation sector can be obtained, that create no or very few net $CO_2$ emissions to the atmosphere.

Several DAC methods have recently been developed based on various technological approaches. For example, U.S. Pat. No. 8,163,066 discloses carbon dioxide capture/regeneration structures and techniques; US 2009/0120288 discloses a method for removal of carbon dioxide from air; US 2012/0174778 discloses a carbon dioxide capture/regeneration method using a vertical elevator; and WO2010022339 discloses a carbon dioxide capture method and facility.

One particular approach is based on a cyclic adsorption/desorption process on solid, chemically functionalized sorbent materials. For example, in WO2010091831 a structure based on amine functionalized adsorbents materials together with a cyclic adsorption/desorption process using this material for the extraction of carbon dioxide from ambient atmospheric air is disclosed.

Therein, the adsorption process takes place at ambient atmospheric conditions at which air is streamed through the sorbent material and a portion of the $CO_2$ contained in the air is chemically bound at the surface of amine functionalized adsorbents. During the subsequent desorption, the material is heated and the partial pressure of carbon dioxide surrounding the sorbent is reduced by applying a vacuum or exposing the sorbent to a purge gas flow. Thereby, the previously captured carbon dioxide is removed from the sorbent material and obtained in a concentrated form.

In WO2012168346A1, a sorbent material based on an amine functionalized cellulose adsorbent is disclosed, which can be used for the above described process. In PCT/EP 2014/057185 a low pressure drop structure composed of particle adsorbent beds is disclosed which can be used for the above described process.

Generally effective desorption processes are desired which offer a high cyclic yield (also known as capacity) typically expressed in mmol of adsorbate per mass of sorbent material, and low energy demand. Further processes which do not damage the sorbent, provide high purity gas and ideally should not require exotic or costly process equipment, are desired. Typical processes include pressure swings, vacuum swings, temperature swings or purge processes with inert gases or a combination thereof. These known processes have specific fields of application, however, many of them are partially, or completely unsuitable for DAC applications. For instance, because the concentration of $CO_2$ in ambient atmospheric air is only about 400 ppm i.e. roughly 0.04%, any pure pressure swing process would need to evacuate large volumes to very low absolute pressures i.e. less than 0.04 $mbar_{abs}$ to drive desorption. Such a vacuum system is likely not to be feasible or economical on the very large scales required by DAC applications. A pure temperature swing process is also limited in its usage because the amine functionalized adsorbents most attractive for DAC are prone to degradation above temperatures of approx. 120° C. which again limits the extent of the temperature swing and therefore the achievable cyclic yield when adsorbing $CO_2$ from air at ambient atmospheric conditions.

While the usages of inert gas purge desorption with nitrogen or even air have been demonstrated, these methods have limited application for DAC since the desorbed $CO_2$ is obtained in diluted form. Steam however is an inert gas which is condensable making it both recoverable and separable. Steam has been used for desorption in the fields of gas separation, soil treatment and more recently for DAC processes. The difficulty with using steam as a purge gas is the very large energy demand in its production and the typically large molar ratios required between the purge gas and the desorbate so as to achieve attractive cyclic yields. Further, a transient process alternating in its temperature range—such as a DAC process alternating between ambient atmospheric conditions for adsorption and elevated temperatures for desorption—may experience condensation of steam which can pose difficulties in handling.

Certain combinations of the above mentioned methods have also been used. U.S. Pat. No. 1,129,543 applied nitrogen, air and steam to vacuum swing desorption for recovering hydrocarbons. U.S. Pat. No. 5,540,758 desorbed various gases adsorbed at elevated pressures with a vacuum swing using air as a purge gas. U.S. Pat. No. 7,285,154 desorbed Xenon by applying a nitrogen purge flow to a vacuum swing and by applying a nitrogen purge flow to a temperature swing. EP 1142623 applied steam as a purge gas at high temperatures to desorb CO2 under a vacuum. WO2014/073004 relates to a system and method for removing carbon dioxide particles in a closed environment of high carbon dioxide concentration. The document describes an improved method for removing carbon dioxide from a re-circulating gas stream by means of a carbon dioxide adsorbent resin in a closed habitat environment. An absorption assembly comprises at least five filter beds, each filter bed being filled with a certain amount of resin. Out of five, two filter beds operate in parallel adsorption mode initially, while the other two beds during that period are either idle or in regeneration mode. The fifth bed is used for the adsorption of by-product generated during the process. The regeneration period of the beds is 10-20 minutes with a saturated steam passed from inlet valve connected in each filter resin bed and at a pressure of 1.1-1.2 bar absolute. GB1296889, WO2011137398 and US2012174779 applied a pure steam purge at atmospheric pressure to a solid sorbent to desorb CO2 captured out of the air.

SUMMARY OF THE INVENTION

The present invention relates to a process and devices for the regeneration of materials used in gas separation by adsorption which can achieve both a high cyclic yield in cyclic adsorption-desorption processes and a high purity of desorbed gas. The basic underlying principle is to combine the temperature vacuum swing adsorption-desorption cycles which are known to produce a very high purity desorption gas with steam as a purge gas which is known to support desorption processes and achieve high cyclic yield with short process times.

More specifically, the present invention relates to a method according to claim 1, namely a method for separating gaseous carbon dioxide from a gas mixture, where the gas mixture is preferably air and/or flue gas containing said gaseous carbon dioxide as well as further gases different from gaseous carbon dioxide (including normally also water) by cyclic adsorption/desorption using a sorbent material adsorbing said gaseous carbon dioxide.

The proposed method makes use of a unit containing an adsorber structure with sorbent material, which unit is evacuable to a vacuum pressure of 400 $mbar_{abs}$ or less, and the adsorber structure is (reversibly) heatable to a temperature of at least 80° C. for the desorption of at least said gaseous carbon dioxide. Further the unit can be opened to cross-flow-through of the gas mixture and for contacting it with the sorbent material for the adsorption step.

More specifically, the proposed method comprises the following sequential and in this sequence as many times as necessary and desired repeating steps:
(a) contacting said gas mixture with the sorbent material to allow at least said gaseous carbon dioxide to adsorb on the sorbent material under ambient atmospheric pressure conditions and ambient atmospheric temperature conditions in an adsorption step. Normally the gas mixture will also contain gaseous water, and this will also, at least partially, be adsorbed by the sorbent material. This adsorbed water will subsequently in the desorption step also be released from the sorbent material and will add to the water condensed downstream of the unit, so it will add to the water condensed from the steam separately introduced into the system in subsequent step (b).
(b) evacuating said unit to a pressure in the range of 20-400 $mbar_{abs}$ and heating said sorbent material in said unit to a temperature in the range of 80-130° C. in a desorption step and extracting at least parts of the desorbed gaseous carbon dioxide (preferably the majority, more preferably essentially all of the desorbed gaseous carbon dioxide) from the unit (and e.g. normally as mentioned above also the adsorbed water if present) and at least partly separating gaseous carbon dioxide from water by condensation in or downstream of the unit.
(c) re-pressurizing of the unit to ambient atmospheric pressure conditions and optionally actively cooling the sorbent material to a temperature larger or equal to ambient atmospheric temperature.

The steps (a)-(c) are thus carried out in this sequence as often as necessary and desired, in the sense of (a)-(b)-(c)-(a)-(b)-(c)- . . . or similarly expressed $[(a)-(b)-(c)-]_n$ with n any integer above 2, normally in the range of at least 100 or of at least 1000 or of at least 10'000.

In the context of this disclosure, the expressions "ambient atmospheric pressure" and "ambient atmospheric temperature" refer to the pressure and temperature conditions to that a plant that is operated outdoors is exposed to, i.e. typically ambient atmospheric pressure stands for pressures in the range of 0.8 to 1.1 $bar_{abs}$ and typically ambient atmospheric temperature refers to temperatures in the range of −40 to 60° C., more typically −30 to 45° C. Preferably the gas mixture used as input for the process is atmospheric air, which normally implies a CO2 concentration in the range of 0.03-0.06% by volume. However, also air with lower or higher CO2 concentration can be used as input for the process, e.g. with a concentration of 0.1-0.5% by volume, so generally speaking preferably the input CO2 concentration of the input gas mixture is in the range of 0.01-0.5% by volume.

What is particular about the proposed method is inter alia that in step (b) steam is injected into the unit to flow-through and contact the sorbent material under saturated steam or superheated steam conditions with a superheated steam temperature of up to 130° C. at the pressure level in said unit, and wherein the molar ratio of steam that is injected during the entire step (b) to the gaseous carbon dioxide released during the entire step (b) is less than 40:1 or less than 20:1. This can also be worded as that the molar ratio of steam that is injected during the entire step (b) to the gaseous carbon dioxide released during the entire step (b) is less than 20:1 or 20:1 up to less than 40:1.

Two important differences with respect to the prior art of the proposed process are, inter alia, that within and at the end of step (b) there is a step of separating gaseous carbon dioxide from water by condensation in or downstream of the unit (1), and that the molar ratio of steam that is injected during the entire step (b) to the gaseous carbon dioxide released during the entire step (b) is less than 40:1 or preferably less than 20:1. Considering the prior art situation the steps would not be taken into consideration by the skilled person since the comparably low proportion of the steam to the gaseous carbon dioxide would seem inappropriate and ineffective to the skilled person for efficiently carrying out the process. One of the key differences with respect to the prior art of the proposed processes is thus that within the step (b), steam is used principally as a purging gas under vacuum conditions at moderate temperatures of typically <130° C. which are therefore not damaging to sorbent materials suitable for direct air capture.

According to a first preferred embodiment of the proposed method, step (b) comprises the following sequential steps:

(b1) evacuating said unit to an initial pressure in the range of 20-200 $mbar_{abs}$, preferably in the range of 50-150 $mbar_{abs}$, preferably without actively heating or cooling the sorbent material;

(b2) preheating the sorbent material (during this phase the pressure may remain at the level established in step (b1) but may also increase), preferably to a temperature in the range of 35-60° C. or 35-85° C. (or differently worded in the range of 35-60° C. or in the range of more than 60° C. up to 85° C.), preferably in the range of 45-60° C. or in the range of 45-75° C. (or differently worded in the range of 45-60° C. or in the range of more than 60° C. to 75° C.);

(b3) optionally injecting an initial portion of steam in a pre-purge step (b4) further heating the sorbent material, normally from the temperature level of (b2), to a temperature in the range of 80-130° C., preferably in the range of 90-120° C. and extracting a first portion of said gaseous carbon dioxide from the unit and separating gaseous carbon dioxide from water by condensation in or downstream of the unit;

(b5) injecting steam into the unit to flow-through and contact the sorbent material under saturated steam or superheated steam conditions with a superheated steam temperature of up to 130° C. at a pressure level in the range of 50-400 $mbar_{abs}$, preferably in the range of 100-300 $mbar_{abs}$ while continuing to heat the sorbent material to a temperature in the range of 80-130° C., preferably in the range of 90-120° C. and extracting a second portion of said gaseous carbon dioxide from the unit and separating gaseous carbon dioxide from water by condensation in or downstream of the unit;

Within steps (b2) to (b5) the pressure in the unit can be allowed to increase somewhat with respect to the pressure level established in step (b1). Preferably however it is maintained during steps (b2)-(b5) in the range 50-400 $mbar_{abs}$, preferably in the range of 100-300 $mbar_{abs}$.

As a matter of fact, step (b2) is carried out according to the above-mentioned preferred embodiment with a temperature of up to 85° C., preferably up to 75° C., to release a $1^{st}$ portion of carbon dioxide and water from the sorbent to remove also residual oxygen out of the chamber, in the sense of a self purge which may allow to omit step (b3). By this removal of the oxygen within step (b2) at lower temperatures than within step (b4) further reduces harm of the sorbent material due to oxygen at high temperature.

If step (b3) is used without the above-mentioned self purge, it is possible to only heat in step (b2) the sorbent up to a temperature such that in step (b3) no condensation of the steam takes place, thereby also avoiding further harm of the sorbent by oxygen gas.

According to yet another preferred embodiment, the heat transfer in steps (b2) and (b4) is effected by a heat exchanger element provided in the adsorber structure, preferably involving a heat exchange fluid circulated through the heat exchanger element.

During step (c), before (preferred, meaning that during step (c) one has essentially the same pressure level as within step (b)), during and/or after the re-pressurization, also active cooling of the adsorber structure to a temperature of less than 60° C. is possible and preferred, preferably to a temperature of less than 50° C. This step has the purpose of preventing the exposure of the sorbent material to high temperature oxygen which has been shown to damage certain types of sorbent materials suitable for direct air capture. Preferably therefore, before re-pressurization the adsorber structure is cooled, preferably to a temperature of less than 60° C., preferably less than 50° C., and then the re-pressurization is taking place, optionally still under cooling, cooling can be continued also after the re-pressurization. Also this cooling can be effected by said heat exchanger element provided in the adsorber structure, preferably involving a heat exchange fluid circulated through the heat exchanger element where the removed heat from the adsorber structure can be used in a waste heat regeneration system.

In step (b2) the sorbent material can be heated to a temperature in the range of 45-75° C. using a heat exchanger element integrated into the sorbent material, and/or in step (b4) the sorbent material can be heated to a temperature in the range of 90-120° C. using a heat exchanger element integrated into the sorbent material. In this step, a certain portion of CO2 and H2O will normally desorb from the sorbent material and will displace the remaining air (and the oxygen contained therein) from the vacuum chamber, thereby reducing the exposure of the sorbent material to further potentially damaging oxygen at higher temperatures, as already outlined above. This heating stage may have a duration of less than 30 minutes, preferably less than 15 minutes, more preferably less than 5 minutes. During the optional pre-purge step (b3) the steam injected for purging of the unit can be characterized by a saturation temperature in the range of 17-60° C., preferably in the range of 33-58° C., corresponding to a saturation pressure range of 20-200 $mbar_{abs}$ preferably 50-150 $mbar_{abs}$. Depending on the heat source embodiment, the steam may be injected in superheated state and may experience further superheating upon contact with sorbent material. The total injected steam volume in the pre-purge step (at the pressure prevailing in the unit) typically corresponds to less than 20 or less than 30, preferably less than 10 times the volume of the desorption chamber resulting in a molar ratio of steam that is injected during the pre-purge step to the gaseous carbon dioxide released during the entire step (b) of less than 1:1 preferably less than 0.5:1. This can for example correspond to less than 10%, preferably less than 5% of the total steam injected into the unit during steps (b3) and (b5).

According to yet another preferred embodiment a low-temperature heat source providing heat in the range of 40-80° C. or 35-85° C., preferably in the range of 45-70° C. or 45-75° C. supplies the heat for steam generation in a steam heat exchange or generation unit for use during step (b5) and/or during step (b3). Preferably this low-temperature heat source also supplies the heat for pre-heating of said sorbent material during step (b2). The advantage of using a lower temperature heat source for pre-heating and pre-purging is, as pointed out above, that the sorbent material directly in contact with the conduits of the heat transfer medium will not be exposed to higher temperatures than those of the heat transfer medium, meaning 35-80° C., preferably 45-75° C., thereby reducing the impact of possible degradation of sorbent directly in contact with the heat transfer medium conduits owing to contact with oxygen at higher temperatures. The heating of the bulk sorbent material to the desired temperature range can also be achieved with a single high temperature heat source, thereby however exposing the sorbent in contact with the heat transfer medium conduits to high temperatures 80-130° C., preferably 90-120° C. under conditions of elevated oxygen concentration possibly leading to higher extents of degradation.

Further a high-temperature heat source can be provided providing heat in the range of 80-130° C., preferably in the range of 90-120° C. and which supplies the heat used for heating said sorbent material during step (b5).

The molar ratio of steam that is injected during the entire step (b) to the gaseous carbon dioxide released during the entire step (b) is preferably less than 20:1, more preferably less than 10:1.

Further preferably the pressure in steps (b3)-(b5) is in the range 100-300 $mbar_{abs}$. The temperature in steps (b2) and (b3) can preferably be increased to a value in the range 45-60° C. or 45-75° C.

The temperature in steps (b4) and (b5) can preferably be increased to a value in the range 90-120° C.

The steam used in step (b5) can have a saturation pressure in the range of 50-400 $mbar_{abs}$, preferably in the range of 100-300 $mbar_{abs}$ and a corresponding saturation temperature in the range of 33-76° C., preferably 45-69° C.

A plurality of individual units can be supplied with steam generated by a single steam generation or steam heat exchange unit, wherein this supply can be provided in parallel or in series.

According to another preferred embodiment a plurality of serial individual units is supplied with steam generated by a plurality of steam heat exchange or steam generation units, wherein apart from a most upstream steam generation unit these steam supplies are provided between adjacent individual units. In this case steam can be provided to a first "high pressure" unit by said most upstream heat exchanger, and the steam downstream of the first "high pressure" unit can be, preferably along with extraction of gaseous carbon dioxide originating from the first "high pressure" unit, at least partly condensed downstream of the first "high pressure" unit in a heat exchange and/or steam generation unit thereby providing at least parts of the heat for the generation of steam to a subsequent "medium pressure" unit at lower pressure than in the first "high pressure" unit.

The steam downstream of the subsequent "medium pressure" unit can then be, preferably along with extraction of gaseous carbon dioxide originating from the subsequent "medium pressure" unit, at least partly condensed downstream of the subsequent "medium pressure" unit, in a heat exchange and/or steam generation unit thereby providing at least parts of the heat for the generation of steam to a further "low pressure" unit at lower pressure than that of the "medium pressure" unit, followed by at least partial condensation of the steam downstream of the further "low pressure" unit, along with extraction of gaseous carbon dioxide originating from the further "low pressure" unit.

Such an arrangement can, analogously, be followed by a serial sequence of further units, each at sequentially lower pressure, and the steam downstream of each unit is, preferably along with extraction of gaseous carbon dioxide originating from the respective unit, at least partly condensed downstream of the respective unit in a heat exchange and/or steam generation unit thereby providing at least parts of the heat for the generation of steam to a next unit at lower pressure than in the previous unit. The last unit in said sequence can be followed by a simple condensation unit instead of a heat exchange and/or steam generation unit. Further, such an arrangement can, analogously, also consist of only two serial individual units.

One single heat source can be used for providing the heat for the steam generation and the heat for the heating of the sorbent material in step (b) using a heat exchange fluid passing through a heat exchanger element provided in the adsorber structure and a steam heat exchange unit in a parallel flow arrangement or in a serial flow arrangement where in the case of a serial flow arrangement it first passes through the heat exchanger element provided in the adsorber structure and subsequently through the steam heat exchange unit. Steam originating from injected steam and desorbed water originating from the input gas mixture, in a mixture with gaseous carbon dioxide extracted from the unit in step (b), preferably in steps (b2), (b3), (b4) and (b5), can be condensed in a condensation heat exchanger separating the carbon dioxide at least partly from the condensed water. The condensation heat generated in the condensation heat exchanger can be used, if need be after further increase of the temperature by means of a heat pump, for generating the steam for use in step (b) for the same unit or for other units and/or for heating of other units through heat exchanger elements provided in their adsorber structures preferably during step (b2) and/or can be stored for later use, e.g. for later generation of steam or heating of units.

According to yet another preferred embodiment steam and gaseous carbon dioxide extracted from the unit in step (b) is first compressed in a re-compressor and then passes a combined steam generation condensation heat exchanger (kettle re-boiler) condensing the steam and condensable components of the extracted gas and at least partly separating them from the gaseous carbon dioxide and using the released heat for generating steam for use in step (b) for the same and/or other units.

Typically the sorbent material is a weakly basic ion exchange resin, preferably with primary amine groups, or is an amine functionalized cellulose. Further, various other sorbent materials can be used.

A heat exchange or steam generation unit can also be located in the interior space of the unit generating the steam for step (b) within the wall boundaries of the unit to be evacuated and upstream of the sorbent material.

Also a steam condensation heat exchanger for the condensation of steam and/or separation of gaseous carbon dioxide can be located in the interior space of the unit within the wall boundaries of the unit to be evacuated and downstream of the sorbent material.

Steam downstream of the unit, condensed or not, can also be recycled, if need be after further supply with heat, as steam in step (b) of the same or another unit or for the generation of steam for step (b) of the same or another unit.

Furthermore the present invention relates to the use of a method as outlined above for the separation of carbon dioxide from air.

In addition to that, the present invention relates to a device for carrying out a method as outlined above comprising at least one unit containing an adsorber structure with said sorbent material, the unit being evacuable to a vacuum pressure of 400 $mbar_{abs}$ or less and the adsorber structure being heatable to a temperature of at least 80° C. for the desorption, comprising means for injecting steam into the unit to flow-through and contact the sorbent material under saturated steam or superheated steam conditions with a superheated steam temperature of up to 130° C. at the pressure level in said unit, the unit being openable to flow-through of the gas mixture across and/or through said sorbent material and for contacting it with the sorbent material for the adsorption step.

Preferably at the interior of the wall structure of the unit enclosing said sorbent material a foil layer, in contact with or distant from the respective wall, can be located, wherein preferably the foil layer is based on or consists of a waterproof plastic material There are a number of key differences between the present invention and prior art sorbent desorption processes.

Firstly, by combining a steam purge with a temperature and vacuum swing, the process produces very favorable desorption conditions and can thus arrive at economically attractive cyclic yields (>0.6 mmol CO2/g, preferably >1 mmol CO2/g). Because the pressure is already reduced by the application of a vacuum, the required steam amounts needed for effective reduction of the partial pressure of gaseous carbon dioxide through dilution and the associated energy costs for steam generation are significantly lower compared with an atmospheric pressure steam purge process working at the same partial pressure of desorbed gaseous carbon dioxide. Moreover, due to the attractive cyclic yields achieved by the present invention the energy consumption of this process can be lower vis-à-vis a sole temperature and vacuum swing process.

Secondly, certain presented embodiments differ from the prior art in that they utilize heat recovery to make use of the energy of the steam leaving the process, where the steam originates not only from the steam injection during steam purge but also from desorbed water, which is commonly co-adsorbed when capturing CO2 from ambient atmospheric air or other humid gas mixtures using amine-functionalized adsorbents. Especially recovery of the heat of condensation of the co-adsorbed water offers significant energy savings as further described in an example below. In contrast, prior art processes have no such method of recovering energy of steam condensation in desorption processes.

Thirdly, a key characteristic of the present invention is that at least a major share of the total thermal energy consumption, including at least parts of the energy required for the desorption of co-adsorbed water, can be supplied at 40-80° C. or 35-80° C., preferably 45-70° C. or 45-75° C. This is due to the combination of a steam purge and a vacuum swing desorption, since because of the lower pressure the boiling point of the water, which determines the temperature at which steam generation occurs, is reduced as opposed to ambient pressure conditions. Further, desorption of co-adsorbed water under said reduced pressures typically occurs at a similar temperature level, i.e. in the range of 35-80° C. or 40-80° C., preferably 45-70° C. or 45-75° C., which is why the corresponding required energy can also be supplied at this temperature level. Such a temperature range is considered as largely available waste heat with very limited industrial applicability. In contrast prior art processes require all thermal energy demand at a temperature level of around 100° C. or higher which in turn can be used for industrial processes and is therefore not considered largely available waste heat.

Fourthly, the present invention can comprise a Pre-Purge step as outlined in more detail further below, which can be crucial to avoid oxidation of the amine-functionalized adsorbent material and thus allows significant reduction of operational expenditures (replacement of sorbent). In contrast, the prior art processes have no such steam Pre-Purge step flushing remaining oxygen from the desorption chamber at temperatures below 60° C. or below 80° C. before the onset of CO2 desorption.

Fifthly, the present invention describes the integration of a self-contained steam generation and condensation system specifically sized to the unit or multiple units reducing the capital cost for piping. In contrast prior art processes might require large piping, as further laid out in the examples, consequently translating into increased capital cost.

Moreover there can be further advantages of the present invention over prior art sorbent regeneration processes due to the above and below listed fundamental differences in operation.

According to several preferred embodiments of the present invention, the device and method disclosed herein is used for a process for the regeneration of sorbents for the separation of $CO_2$ from ambient atmospheric air and contains an adsorber structure. Within these embodiments, the above described embodiments are operated in a cyclic adsorption/desorption process where during the adsorption step air is ventilated through the adsorber structure and a portion of the CO2 contained in the air is bound at the surface of the sorbent material therein contained. The desorption process can be composed of various processes steps, which are individually described in the following.

Evacuation. The unit is evacuated from ambient atmospheric pressure to a vacuum pressure of 20-200 $mbar_{abs}$, preferably 50-150 $mbar_{abs}$. The effective oxygen partial pressure is reduced correspondingly. The temperature of the sorbent material is not controlled and therefore remains at around ambient atmospheric temperature.

Pre-Heat. The sorbent material may be heated to a temperature of 35-80° C. or 35-60° C. preferably 45-75° C. or 45-60° C. with heat stemming from an external heat supply. Depending on the temperature reached, a portion of the co-adsorbed water is desorbed. For example, in the device embodiment involving heat sources at different temperature levels, the Pre-Heat could be realized with the lower temperature heat source. Alternatively heat could come from heat of steam condensation of a unit in desorption mode. As mode of heat transfer either a heat exchanger element provided in the adsorber structure or the injection of steam can be used. In the latter case, the steam condenses, rapidly raising the temperature of the adsorber structure and therein contained sorbent to the steam saturation temperature in the range of 17-60° C. preferably 33-58° C. corresponding to the pressure range 20-200 $mbar_{abs}$, preferably 50-150 $mbar_{abs}$. The pressure is maintained approximately constant. During the Pre Heat step, a certain portion of CO2 and H2O will desorb from the sorbent material and displace the remaining air (and contained oxygen) in the vacuum chamber, thereby reducing the exposure of the sorbent material to further potentially damaging oxygen at higher temperatures. This heating stage may have a duration of less than 30 min, preferably less than 15 minutes, more preferably less than 5 minutes. The oxygen partial pressure decreases accordingly with desorbed water and CO2.

Pre-Purge. The adsorber structure is held at a temperature of 35-80° C. or 35-60° C., preferably 45-75° C. or 45-60° C. Steam at a saturation pressure in the range 20-200 $mbar_{abs}$, preferably 50-150 $mbar_{abs}$ with a corresponding saturation temperature in the range of 17-60° C. preferably 33-58° C. is used to flush at least part of the remaining air out of the unit thereby removing oxygen which could potentially degrade the sorbent material at higher temperatures. Depending on the heat source configuration used for steam generation, the steam may be injected as superheated steam. In certain embodiments of the device described above the steam may be further superheated upon contact with the adsorber structure. The Pre-Purge step supports the purging of air and oxygen from the vacuum chamber begun in the Pre Heat step and may be needed for certain sorbent types or operating conditions. Removal of air from the vacuum chamber may serve to a) reduce the exposure of the sorbent material to oxygen at higher temperatures and b) increase the amount of CO2 which can be extracted above a given purity (i.e. >99%) by removing air from the vacuum chamber which would otherwise dilute the product. Therefore, pre purge can improve the lifetime of the sorbent material and increase the purity of the recovered CO2.

Temperature Swing under Vacuum. Further heating of the sorbent from the temperature level of the Pre Heat step is engaged by means of the heat exchanger integrated in the adsorber structure. The sorbent is gradually heated under vacuum to the desorption temperature of 80-130° C., preferably 90-120° C., thereby releasing gaseous carbon dioxide and co-adsorbed water and accomplishing the temperature swing. The pressure can be changed from the preceding stages and is held in the range of 50-400 mbar$_{abs}$, preferably 100-300 mbar$_{abs}$. Alternatively, the sorbent material could be only heated to slightly above the steam saturation temperature at the desorption pressure. In this alternative process, though depending strongly on the temperature achieved, most likely little gaseous carbon dioxide would be released.

Steam Purge under Vacuum. The pressure can be changed from the preceding stages and is held in the range of 50-400 mbar$_{abs}$, preferably 100-300 mbar$_{abs}$. Steam at a saturation pressure in the range 50-400 mbar$_{abs}$, preferably 100-300 mbar$_{abs}$ and the corresponding saturation temperature 33-76° C., preferably 45-69° C. is used as purge gas and passed through the adsorber structure. Depending on the heat source configuration used for steam generation, the steam may be injected as superheated steam. In certain embodiments of the device described above the steam may be further superheated upon contact with the adsorber structure. This stage accomplishes the steam purge and provokes a rapid reduction in the partial pressure of the gaseous carbon dioxide in the unit and a rapid release of further parts of the gaseous carbon dioxide. The adsorber structure is continually heated with the adsorber structure heat exchanger. If the adsorber structure was heated to slightly above the steam saturation temperature, heating with the adsorber structure-integrated heat exchanger serves to further raise the temperature of the adsorber structure to the final desorption temperature and provide the heat of desorption. If the adsorber structure was heated to the final desorption temperature before the steam flow was started, heating with the adsorber structure-integrated heat exchanger serves to provide the heat of desorption and therefore to maintain the temperature of the adsorber structure. Potentially, the temperature of the adsorber structure and sorbent material may fall slightly due to the rapid consumption of heat of desorption. The steam flow rate may be constant or can be continuously adapted to the rate of release of gaseous carbon dioxide. The cumulative dilution of desorbed gaseous carbon dioxide to steam can be less than 40:1 or less than 20:1, preferably less than 10:1 moles steam to moles desorbed gaseous carbon dioxide. Reduced dilution reduces the release rate and quantity of desorbate and increases the desorption process time. Ratios under 1:1 moles of steam to desorbed gaseous carbon dioxide may lead to additional product yields which are too small to justify the cost and complexity of additional equipment related to steam delivery. This range is based on theoretical considerations of adsorption isotherms, energy demand and practical considerations of plant construction as well as experimental data. Only in consideration of adsorption isotherms, it is most attractive to reduce the partial pressure of the gaseous carbon dioxide as low as possible by purging with high dilution ratios. For example, at a desorption pressure of 100 mbar$_{abs}$, purging with 100:1 moles steam to moles gaseous carbon dioxide would yield an effective gaseous carbon dioxide partial pressure of 1 mbar$_{abs}$. This dilution ratio however represents a high energy demand which is roughly one order of magnitude higher than the goal energy demand for desorption for a direct air capture process. Further, from infrastructure considerations, large diameter piping for steam delivery can be very costly and it is therefore important to work at steam flow rates which keep the required piping diameters to a minimum. These dilution ratios are strongly related to the specific sorbent material used as well as the desorption temperature and are an important aspect of this invention not at all obvious from the prior art.

Cooling. Steam is shut off along with the heating of the adsorption structure and the sorbent is cooled under vacuum by flowing a cold heat transfer fluid through the heat exchanger integrated into the adsorber structure in FIG. 1. Cooling continues to preferably below 60° C., further preferably below 50° C., prior to re-pressurization in order to avoid exposing the sorbent to oxygen at high temperatures. During cooling the pressure in the vacuum chamber sinks gradually from the level seen in the previous stages as remaining CO2 in the vacuum chamber is reabsorbed and remaining H2O is reabsorbed or condenses. End pressure in the vacuum chamber can be as low as a few mbar$_{abs}$.

Re-pressurization. The unit is re-pressurized to ambient atmospheric condition through a venting valve. Once the pressure has equalized with the ambient atmospheric pressure the adsorption valves are opened and the unit is ready for the next adsorption stage. For plants operating with multiple units with shifted process sequences, it can be possible to couple certain units and re-pressurize them with units undergoing evacuation. In this manner, a certain portion of the evacuation work can be saved.

In a first preferred embodiment, the process is composed of the following 5 steps: Evacuation, Temperature Swing under Vacuum, Steam Purge under Vacuum, Cooling, Re-pressurization.

Another preferred embodiment of the process is composed of the following 6 steps: Evacuation, Pre-Heat, Temperature Swing under Vacuum, Steam Purge under Vacuum, Cooling, Re-pressurization.

Another preferred embodiment of the process is composed of the following 7 steps: Evacuation, Pre-Heat, Pre-Purge, Temperature Swing under Vacuum, Steam Purge under Vacuum, Cooling, Re-pressurization.

According to further embodiments, the process is composed of further combinations of the above described process steps.

The proposed stage Pre-Purge can avoid exposing the sorbent to high temperature oxygen and irreversibly damaging it. By applying a vacuum, it is possible to produce non condensing steam at lower temperatures, well below 100° C., for example 60° C., which can act as a purge gas. Such a purge process at a moderate temperature is only possible under vacuum conditions. Further, the temperature range for steam under vacuum is defined by the degradation of the sorbent material and by the energy of evacuation of the unit. It has been shown that certain amine functionalized solid sorbents which have favorable properties for direct air capture can be degraded by contact with oxygen at temperatures above about 60° C. Evacuation of a vacuum unit to pressures less than 20 mbar$_{abs}$ represents a significant energy investment which may be unfeasible for certain direct air capture applications. Further the lower the pressure of evacuation, the longer is the duration of this stage. Alternatively, larger pumps representing increased capital costs must be applied. From these considerations, the saturation temperature range of steam for a possible purge step can be determined to lie between 17° C. (saturation temperature at 20 mbar$_{abs}$) and 60° C., preferably between 33-58° C. corresponding to 50-150 mbar$_{abs}$. The definition of this range is specific to direct air capture and the sorbents used and is by no means obvious from the prior art. Prior art processes either do not purge the oxygen or use an inert gas such as N2 which is difficult to recover. The advantage of using steam for such a purge stage is that it is both recoverable and separable (for example by the heat recovery and condensation methods described above) and already a part of the herein disclosed device. Furthermore, because the vacuum structure in which the sorbent material is housed is evacuated before the Pre-Purge is initiated, the total volume of air which must be purged is significantly reduced as compared with an atmospheric pressure purge process.

Another feature of the disclosed processes of this invention is that through the combination of the Temperature Swing under Vacuum and Steam Purge under Vacuum, a cyclic yield is achieved which is close to a pure steam purge cyclic yield while requiring significantly less steam for dilution than a pure steam purge process while achieving a high product gas purity. The duration and temperature range of the stages Temperature Swing under Vacuum and Steam Purge under Vacuum define strongly the amounts of gaseous carbon dioxide released. The higher the temperature and longer the duration of the stage Temperature Swing under Vacuum, the higher the portion of the gaseous carbon dioxide herein released. Subsequently, the steam demand in the stage Steam Purge under Vacuum at a defined molar ratio of steam to gaseous carbon dioxide is reduced. In this manner, the process can be adapted to factors such as availability of heat sources, their temperature ranges, the cost of heat, sorbent characteristics and other operating parameters.

Another attractive feature of the process is that the steam flow rate in stage Steam Purge under Vacuum can be linked with the gaseous carbon dioxide release rate and continuously adapted. In certain cases of elevated temperatures this produces a rapid gaseous carbon dioxide release at the start of the stage Steam Purge under Vacuum where a small amount of steam drives rapid desorption. As the desorption rate drops, gradually, the steam flow can be reduced correspondingly to the preferred molar ratios in order to reduce the energy demand for steam generation. This adaptive steam flow technique can also shorten the duration of the desorption process against a constant steam flow technique.

In one embodiment of the process, steam can be used as both a heat transfer medium—as one possibility for the Pre-Heat stage—as well as a purge gas for the Pre-Purge and Steam Purge under Vacuum stages.

A further important advantage is that through the generation of steam under vacuum pressure, heat may be used at temperatures lower than for the desorption stage (b4)—between 40-80° C. preferably 45-70° C. This is in contrast to the inventions of the prior art which used the same temperature heat sources for steam generation and desorption. Firstly, this feature is important as certain amine functionalized solid sorbents suitable for DAC applications may be damaged by temperatures in excess of 120° C. Secondly, low temperature heat is also economically more attractive as it does not contend with industrial uses as may be the case with heat at higher temperatures.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
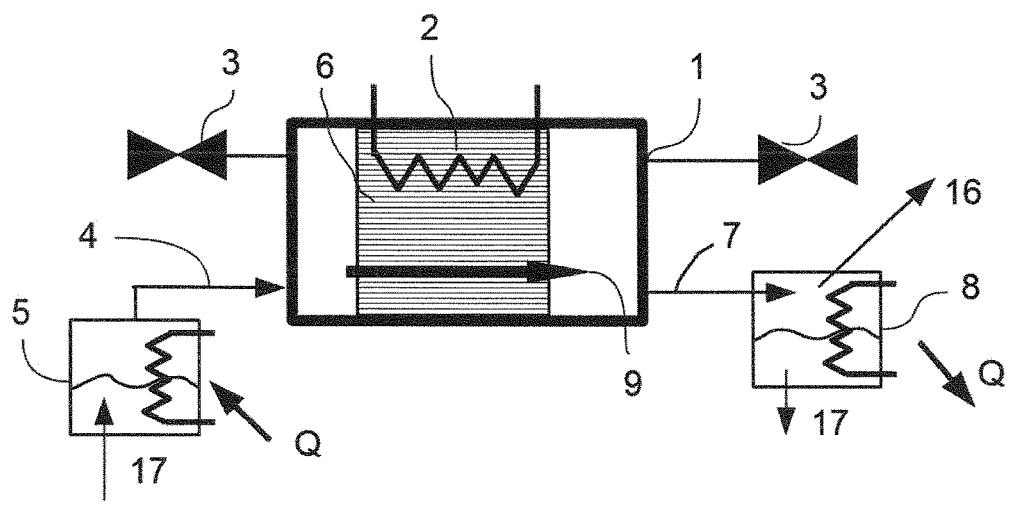
FIG. 1 shows the basic concept of integrating a steam purge with a temperature vacuum swing desorption.

FIG. 1 shows the basic concept and the basic elements of integrating a steam purge with a temperature vacuum swing desorption. The sorbent material, possibly contained in an adsorber structure 6 is contained in a unit 1 with a closed wall structure which is capable of withstanding vacuum pressures of normally 400 mbar$_{abs}$ and lower. The sorbent material is first loaded with the carbon dioxide by allowing contact between a gas mixture containing the carbon dioxide and the sorbent material. Once the desired level of loading has been reached, the unit is sealed with the appropriate valves 3 and evacuated to the desired vacuum pressure of typically in the range of 20-200 mbar$_{abs}$ preferably 50-150 mbar$_{abs}$ to achieve the pressure swing. The sorbent material within the adsorber structure 6 is also heated to a temperature between 80-130° C. preferably 90-120° C. with an adsorber structure heat exchanger 2 to achieve the temperature swing. During this phase the pressure can change and is maintained in the range 50-400 $mbar_{abs}$, preferably 100-300 $mbar_{abs}$. Steam 4 is produced from liquid water 17 in a steam generation heat exchanger 5 which is driven by heat input Q and injected into the unit at a non-condensing condition such that the effective partial pressure of carbon dioxide is reduced below that of the applied vacuum pressure. The steam passes through the adsorber structure 6 and the contained sorbent material along arrow 9. Desorbed gas 7 in combination with desorbed water (if present) and purge steam is withdrawn by a vacuum pump from the unit. The steam is condensed at the condensation heat exchanger 8 leaving behind the desired high purity carbon dioxide 16, liquid water 17 and releasing the condensation heat Q.

Figure 2:
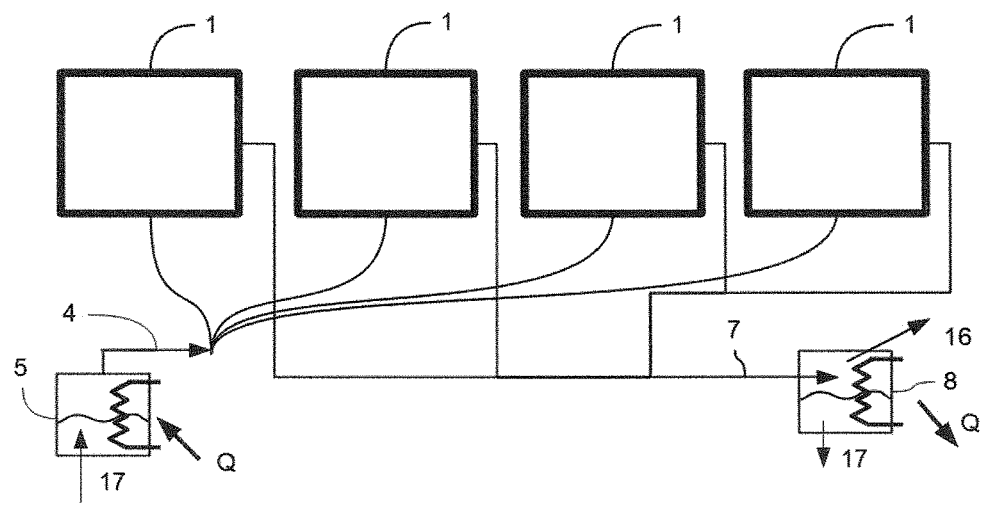
FIG. 2 shows an embodiment coupling multiple units with one steam generation heat exchanger and one steam condensation heat exchanger.

FIG. 2 shows an embodiment coupling multiple adsorption units 1 with one steam generation heat exchanger 5 for energy consumption minimization purposes. This involves coupling more than one unit 1 to a single steam generation heat exchanger 5 by corresponding tubing. Such a setup can be combined with coupling the multiple units 1 to a single condensation heat exchanger 8. In this manner, multiple units could be treated with steam from one set of process devices, which simplifies control, reduces the number of components, and allow us to optimize energy consumption and maintenance.

Figure 3:
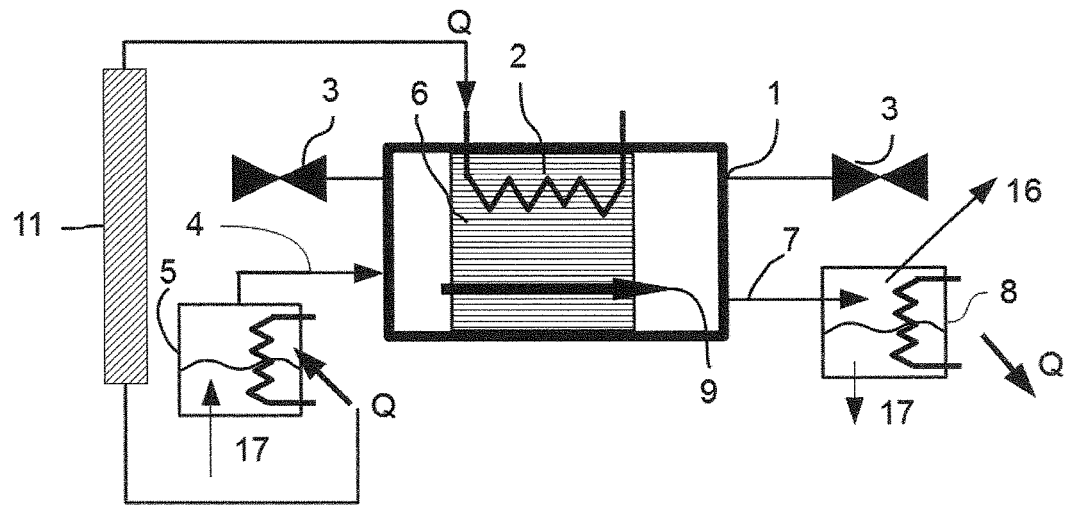
FIG. 3 shows an embodiment in which the steam generation heat exchanger and the heat exchanger structure of the adsorption structure are supplied by the same heat source in parallel.

FIG. 3 shows an embodiment in which the steam generation heat exchanger and the heat exchanger structure of the adsorption structure are supplied by the same heat source in parallel. The steam is produced at a steam generation heat exchanger 5 using the same high temperature heat source 11 as that supplying the adsorber structure heat exchanger 2. Heat can be transferred, for example with a heat transfer fluid in a parallel fashion through the steam generation heat exchanger 5 and the adsorber structure heat exchanger 2.

Figure 4:
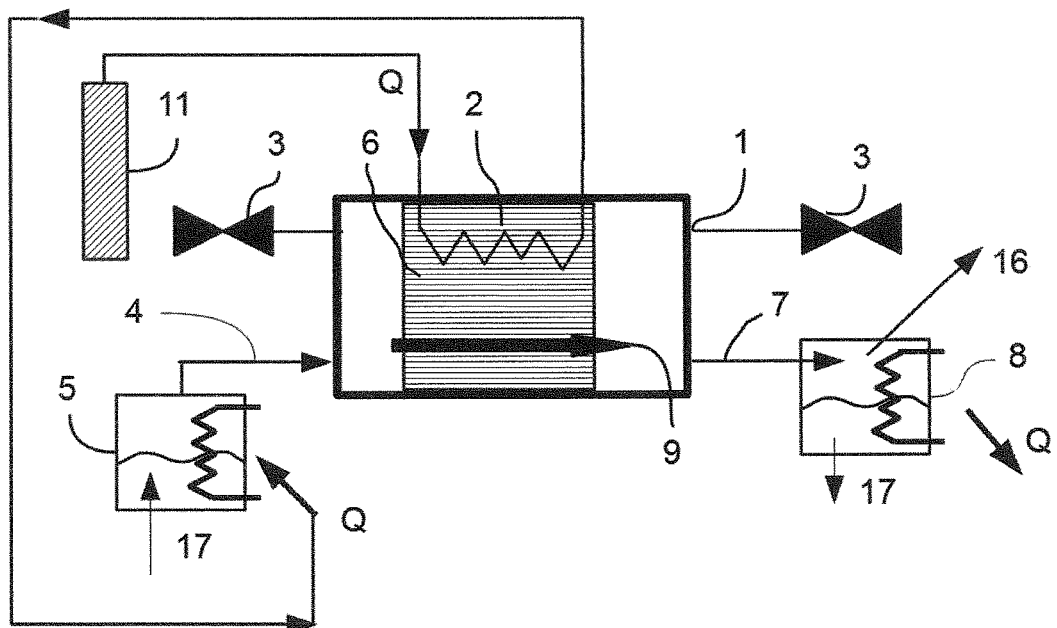
FIG. 4 shows an embodiment in which the steam generation heat exchanger and the heat exchanger structure of the adsorption structure are supplied by the same heat source in series.

FIG. 4 shows an embodiment in which the steam generation heat exchanger and the heat exchanger structure of the adsorption structure are supplied by the same heat source in series allowing for better adaptation of the temperature levels for further minimizing energy consumption. In this case the steam generation heat exchanger 5 is in series and downstream of the adsorber structure heat exchanger 2 as shown in FIG. 4, the latter being supplied by heat by the high temperature heat source 11. As the steam saturation temperature, for example 60° C. for a desorption pressure of 200 $mbar_{abs}$, is typically lower than the goal desorption temperature to be reached in the adsorber structure 6, for example 95° C., this embodiment may—depending on the design of the steam generation heat exchanger—produce superheated steam. In the embodiment involving a series connection of heat transfer fluid, steam production can only begin after the exit temperature of the adsorber structure heat exchanger has exceeded the saturation temperature. Therefore different process sequences may need to be applied.

Figure 5:
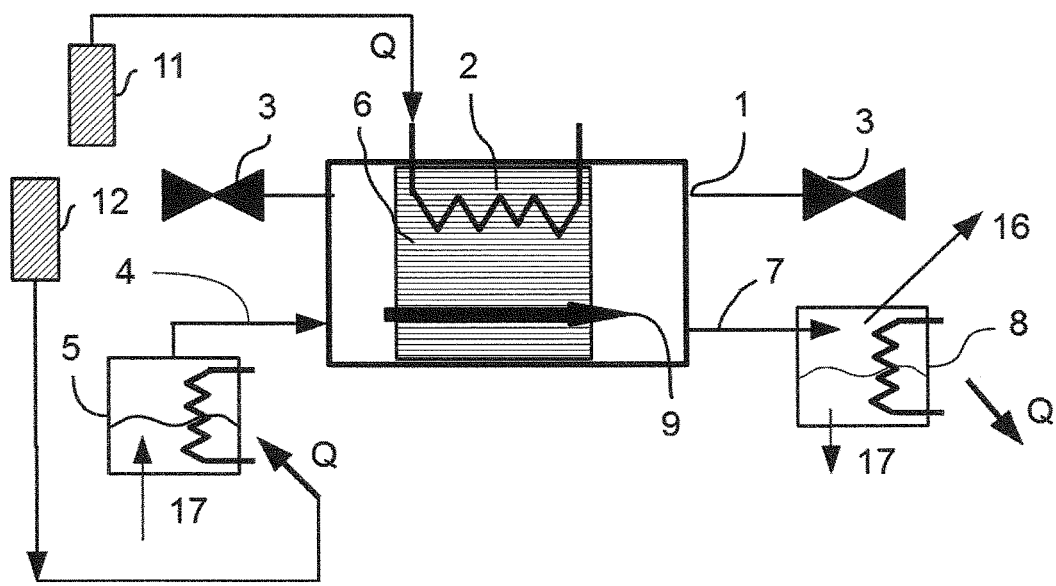
FIG. 5 shows an embodiment in which the steam generation heat exchanger and the heat exchanger structure of the adsorption structure are supplied by two different heat sources at different temperatures.

FIG. 5 shows an embodiment in which the steam generation heat exchanger and the heat exchanger structure of the adsorption structure are supplied by two different heat sources at different temperatures. The steam generation heat exchanger 5 in this case is supplied from a different, preferably lower temperature heat source 12 than the adsorber structure heat exchanger 2, which is supplied by the high temperature heat source 11. It should be noted that the lower temperature heat source 12 can also in parallel or in series be used for preheating the adsorber structure in a first phase and only once the adsorber structure is at a sufficient temperature to use the high temperature heat source 11. This embodiment illustrates at least one significant advantage of the combination of steam purge with vacuum desorption of the present invention over prior art: While the heat that is needed to bring the sorbent material to desorption temperature through the adsorber structure heat exchanger 2 is at least partly required to be at a temperature level of around 85-130° C., preferably 90-120° C., the combination of steam purge and vacuum desorption allows for steam generation (i.e. water evaporation) in the steam generation heat exchanger 5 at a significantly lower temperature level in the range of 35-80° C. preferably 45-75° C.—corresponding to the saturation temperatures within the range of possible desorption pressures 50-400 $mbar_{abs}$ preferably 100-300 $mbar_{abs}$. At this temperature level, heat can be available at potentially much lower cost than at the higher temperature level. This important aspect of this invention is possible due to the applied vacuum within the unit and is by no means obvious from the prior art.

Figure 6:
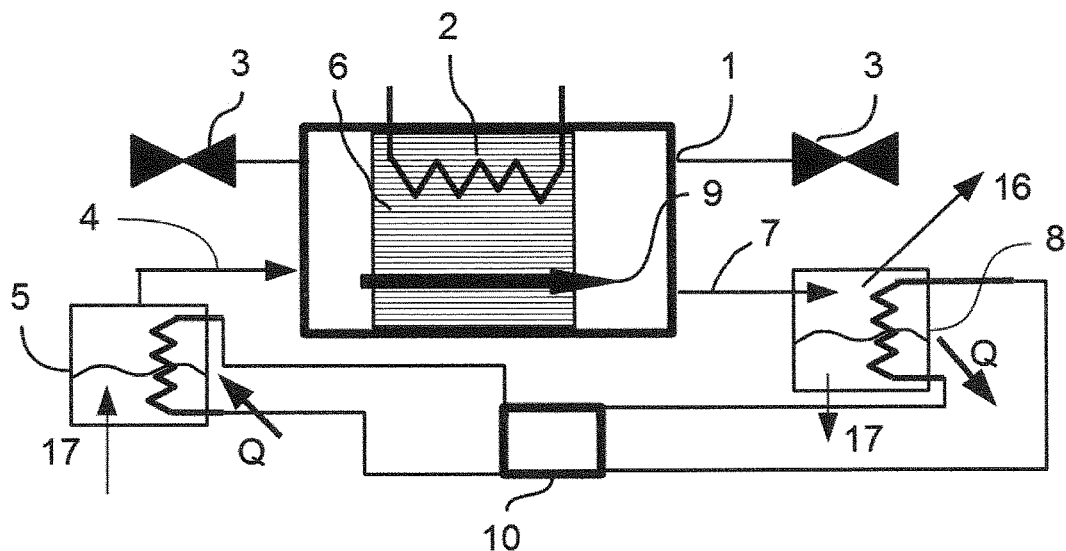
FIG. 6 shows an embodiment coupling the steam generation and condensation heat exchanger with a heat pump to recover heat of condensation to steam generation.

FIG. 6 shows an embodiment coupling the steam generation and condensation heat exchanger with a heat pump to recover heat of condensation to steam generation. In this case, the steam generation heat exchanger 5 and condensation heat exchanger 8 are connected with a heat pump 10. The heat of vaporization Q can thusly be recovered in the heat of condensation Q. To achieve this, only a small portion of electricity, relative to the amount of heat recovered Q, will be required to power the heat pump which needs to upgrade the temperature level of the heat only by a small temperature difference, as further laid out in the examples below. A further expansion of this embodiment could see multiple units connected to a single heat pump or multiple units connected to a combination of steam generation and condensation heat exchangers with a heat pump.

Figure 7:
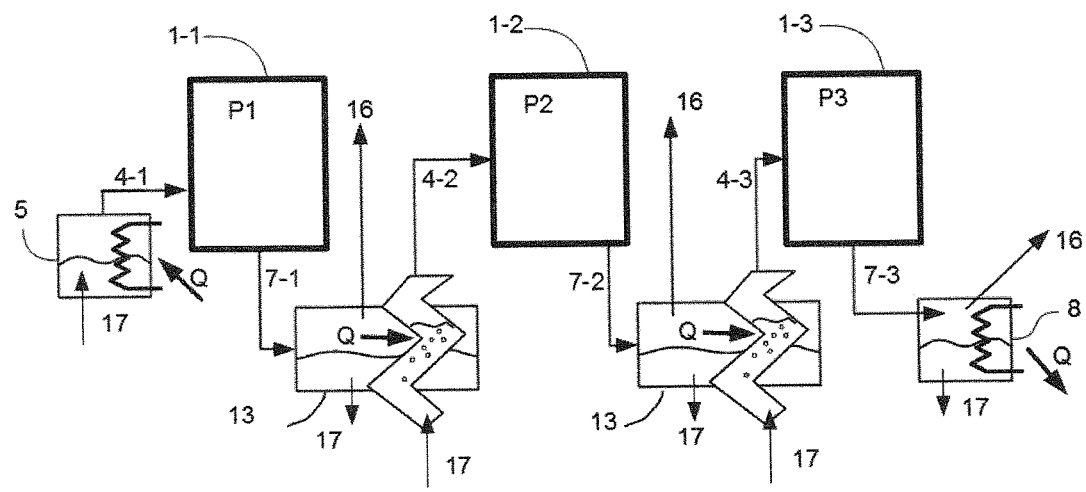
FIG. 7 shows an embodiment coupling multiple units at different pressure levels in a cascade formation.

FIG. 7 shows an embodiment coupling multiple units at different pressure levels in a cascade formation. In this case multiple units are connected in sequence and desorbed at decreasing pressures. FIG. 7 shows a possible example of three units 1-1, 1-2, 1-3 desorbing at pressures P1, P2, P3 where P1>P2>P3. High temperature level steam 4-1 is produced at one steam generation heat exchanger 5 with a heat input Q and fed into the first unit 1-1 at pressure P1. The desorbed gaseous carbon dioxide and steam 7-1 exit the first unit and flow into a combined steam generation-condensation heat exchanger 13 where the mixed steam and gaseous carbon dioxide flow 7-1 leaving the first unit is condensed at saturation conditions P1 and T1 producing a high purity gaseous carbon dioxide 16 and liquid water flow 17. The heat of the condensed steam at P1 and T1 is transferred through the combined steam generation-condensation heat exchanger 13 and used to produce the medium temperature steam flow 4-2 at pressure P2 with a saturation temperature of T2 which flows further into the second unit 1-2 at desorption pressure P2 where it again supports desorption. Finally at the last unit 1-3, steam at P3 with desorbed gaseous carbon dioxide 7-3 is again condensed at P3 and T3 by a condensation heat exchanger 8 leaving behind high purity gaseous carbon dioxide 16 and liquid water 17. The special feature of this embodiment is the fact that the decreasing desorption pressures and corresponding decreasing steam saturation temperatures of the subsequent units are chosen in a way such that in each combined steam generation-condensation heat exchanger a sufficient temperature gradient exists that enables efficient heat transfer. This in turn enables a very efficient recovery of the heat of condensation of the steam leaving the units. It is to be understood that this embodiment is not limited to three units and that the pressures of desorption in the multiple units for steps (b4)

and (b5) fall within the ranges which are deemed attractive for desorption (50-400 mbar$_{abs}$ preferably 100-300 mbar$_{abs}$).

Figure 8:
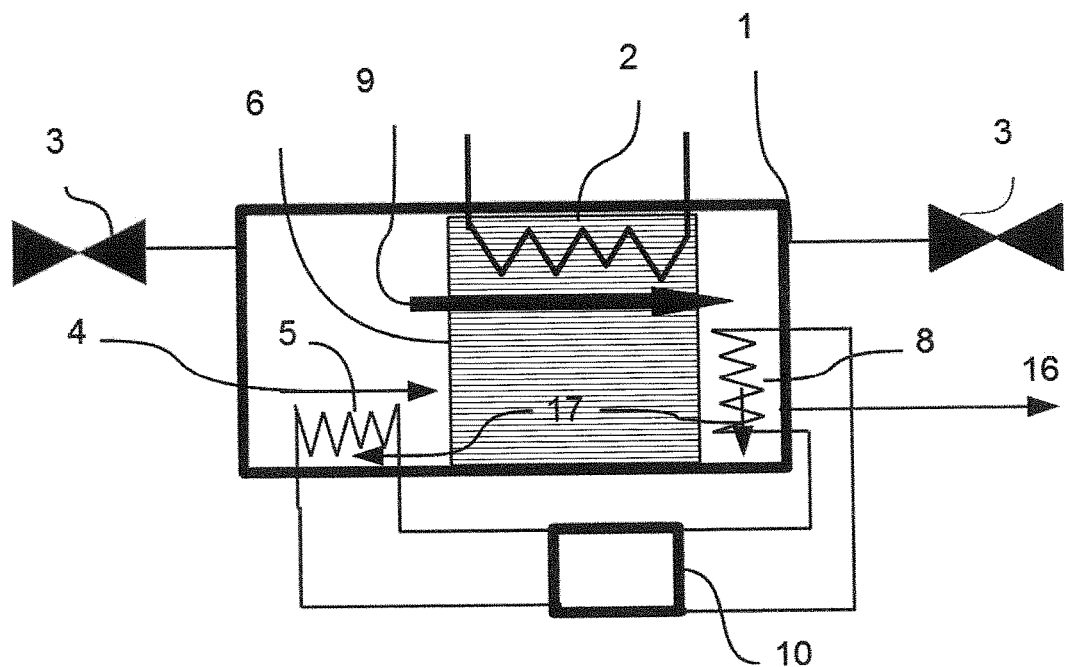
FIG. 8 shows an embodiment integrating the steam generation and condensation heat exchanger inside the unit and coupling them with a heat pump to recover heat of condensation to steam generation.

FIG. 8 shows an embodiment integrating the steam generation and condensation heat exchanger inside the unit and coupling them with a heat pump to recover heat of condensation to steam generation. In this case, the steam generation 5 and condensation 8 heat exchangers are integrated into the unit and connected with a heat pump 10. In this manner steam can be produced and condensed directly in situ, i.e. at the site of use in very close proximity to the adsorber structure 2. Further liquid water 17 arising from steam condensation can be internally transferred to the steam generation heat exchanger 5 to be once again used for steam generation. Because all process steam is generated and condensed within the unit 1 in this embodiment, the dimensions of piping for gas transport do not need to take steam into account. This is particularly crucial for higher molar ratios of steam to desorbed gas where the steam volume flow can for example represent 95% of the volume throughput of the piping and imply potentially uneconomical conduit sizes. Particularly for prior art processes requiring high dilution, i.e., high molar flows of steam to desorbed gas (e.g. US2011/0226872 A1), costs of piping, connection, valves and process equipment may be a very large and potentially prohibitive cost element. A further option of this embodiment sees the internally integrated steam generation heat exchanger 5 being supplied from an external heat source.

Figure 9:
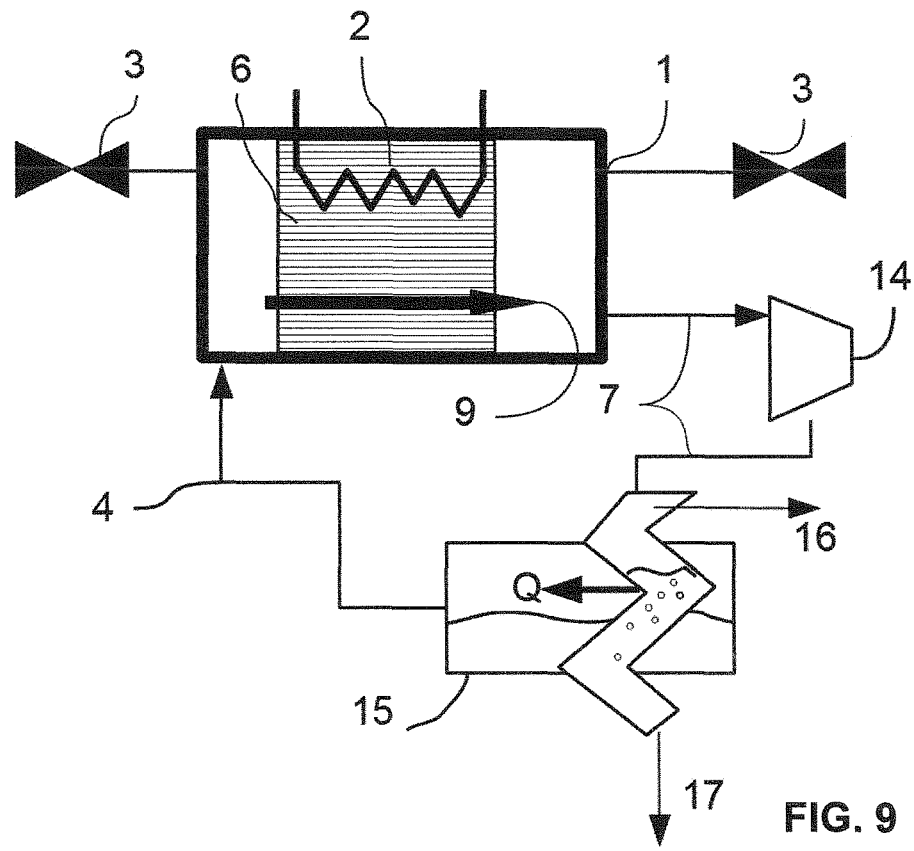
FIG. 9 shows an embodiment re-compressing the gas leaving the unit before condensing the vapor in a kettle re-boiler.

FIG. 9 shows an embodiment re-compressing the gas leaving the unit before condensing the vapor in a kettle re-boiler. The steam and desorbed gaseous carbon dioxide 7 leave the unit 1 and pass through a re-compressor 14 which increases the pressure and correspondingly the saturation temperature. The re-compressor is well insulated to prevent heat losses and the mixture of steam and desorbed gas leave the re-compressor with a saturation temperature higher than the saturation temperature of the gas mixture leaving the unit. Reducing heat losses from the re-compressor is known to those skilled in the art to reduce the efficiency however it assures a good quality of re-compressed steam. The re-compressed gas flow passes through a kettle re-boiler 15 where the steam is condensed leaving behind a high purity gaseous carbon dioxide flow 16 and a liquid water 17. The herein released condensation energy Q generates steam at the saturation temperature and desorption pressure of the unit and is fed directly into the unit 4. In this manner, the steam generation heat exchanger is avoided. This procedure represents a special kind of heat pump in which the vapor is at the same time a process gas and the heat pump working fluid. In this embodiment, one re-compressor 14 and/or kettle re-boiler 15 can be used for multiple units 1.

In all the above mentioned embodiments, liquid water arising from the condensed steam can be reused for steam generation. Ideally this water can be available at the saturation temperature of the condensed steam. Reusing this water flow can reduce the input heat Q by the sensible portion. For a possible steam generation temperature of 60° C. (at a saturation pressure of 200 mbar$_{abs}$), the heat required for producing steam from 10° C. liquid water represents roughly 10% of the total energy input which may represent an attractive energy saving for certain processes. Further reusing this water for steam generation emits significantly less waste water than a through flow process which reduces the load on water demand, water purification and steam preparation, ultimately reducing process costs.

In the above mentioned embodiments it can be advantageous to achieve a homogenous steam distribution. This can be achieved by injecting the steam on the opposite side of the adsorber structure from the vacuum extraction port as shown in for example FIG. 1. In this manner, the good gas distribution properties of certain adsorber structures can be utilized to provide good contact of steam with sorbent material.

As a certain quantity of condensed water will likely be present in the unit due to the condensation on the unit walls of injected steam and desorbed water, the unit can be tilted in such a manner that this water flows towards the vacuum extraction port and is thusly removed from the unit.

A steam barrier can be integrated into the unit to prevent excessive steam losses to the walls of the unit. The advantage of this aspect is a lower steam demand, a more homogenous steam distribution within the unit and a more effective steam generation and condensation on the heat exchangers. Such a steam barrier can for example be a thin metal sheet or high temperature resistant plastic sheet which is set at a defined spacing from the unit walls. As the thermal mass of such a steam barrier is small, steam condensation will quickly raise the temperature to the saturation temperature of steam limiting further steam condensation. Steam condensation of the unit walls can thus be significantly reduced.

According to one embodiment of the invention, the sorbent material used for the process is a granular weak basic ion exchange resin suitable for the capture of $CO_2$ from ambient atmospheric air. Another sorbent material suitable for use with this invention can be amine functionalized cellulose as described in WO2012/168346.

Further embodiments of the present invention include various combinations of the above disclosed embodiments. For example, heat sources at two different temperature levels can be combined with a heat pump recovering the heat of condensation from multiple units and re-using condensed water for renewed steam generation.

Example 1: Steam Assisted Desorption Process

Figure 10:
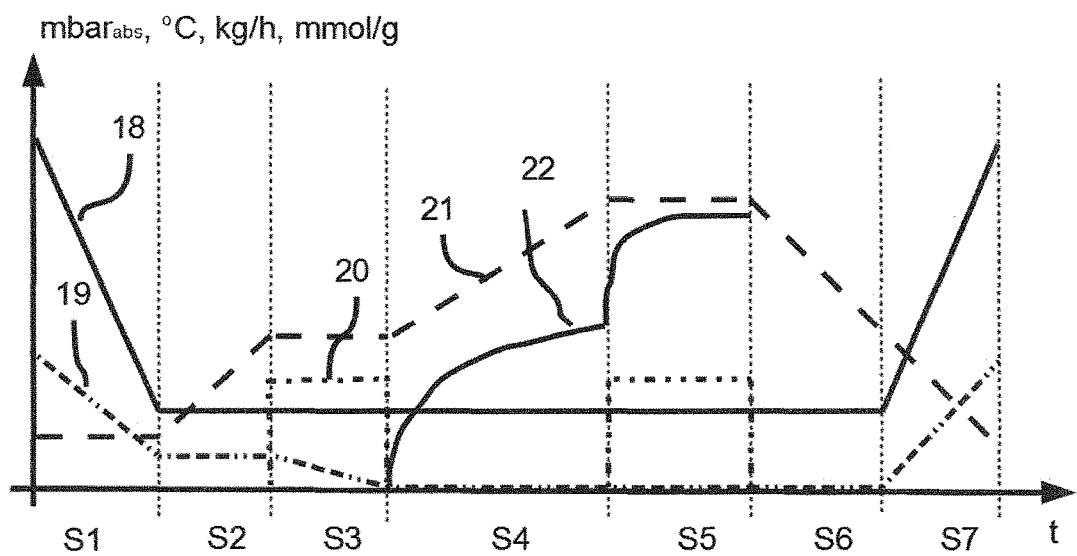
FIG. 10 shows a possible process sequence.

The process is shown in FIG. 10 and comprises, after a step of loading the adsorber with gaseous carbon dioxide under ambient atmospheric pressure and temperature, the following stages:
- S1—Evacuation: To the desorption pressure of 200 mbar$_{abs}$, the oxygen partial pressure drops correspondingly,
- S2—Pre-Heat: A heat source supplies heat to the adsorber structure heat exchanger to raise the temperature of the sorbent material to 60° C.,
- S3—Pre-Purge: Steam flow is started after the adsorber structure has reached the Pre-Heat temperature to flush out oxygen. The oxygen concentration drops progressively to near zero,
- S4—Temperature Swing under Vacuum: From the Pre-Heat temperature of 60° C. to the final desorption temperature of 110° C. Desorption of gaseous carbon dioxide achieves a capacity of 0.5 mmol/g once the final temperature is reached,
- S5—Steam Purge under Vacuum: Steam is flown at a constant flow rate at a constant sorbent material temperature. Gaseous carbon dioxide is released rapidly and brings the total desorbed capacity to 1 mmol/g,
- S6—Cooling: The sorbent material is cooled under vacuum with the adsorber structure heat exchanger to below 50° C.,
- S7—Re-pressurization. The unit is re-pressurized to atmospheric pressure before the adsorption is restarted.

Example 2: Experimental Performance of One Process Embodiment

Figure 11:
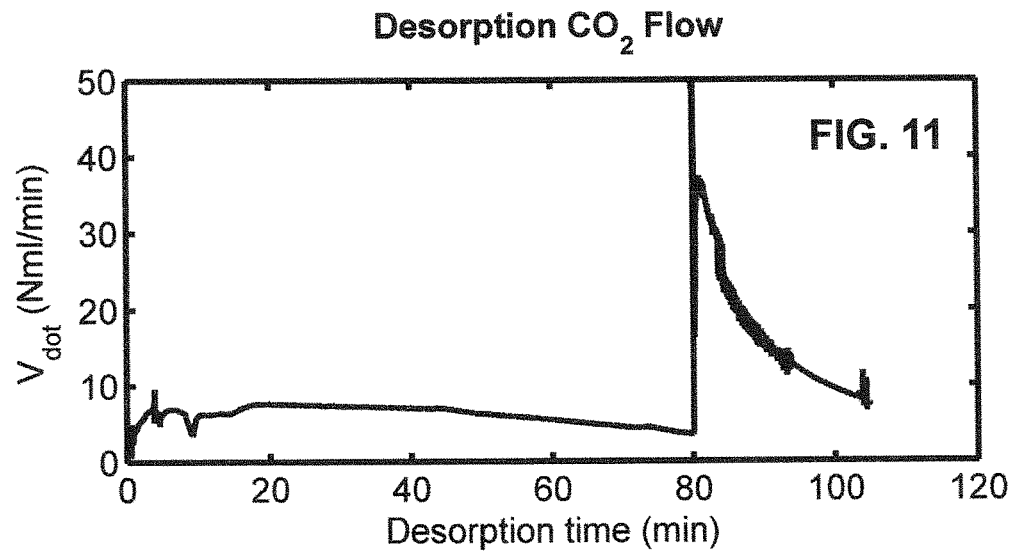
FIG. 11 shows the measured flow of CO2 being desorbed in a delayed steam delivery process.
Figure 12:
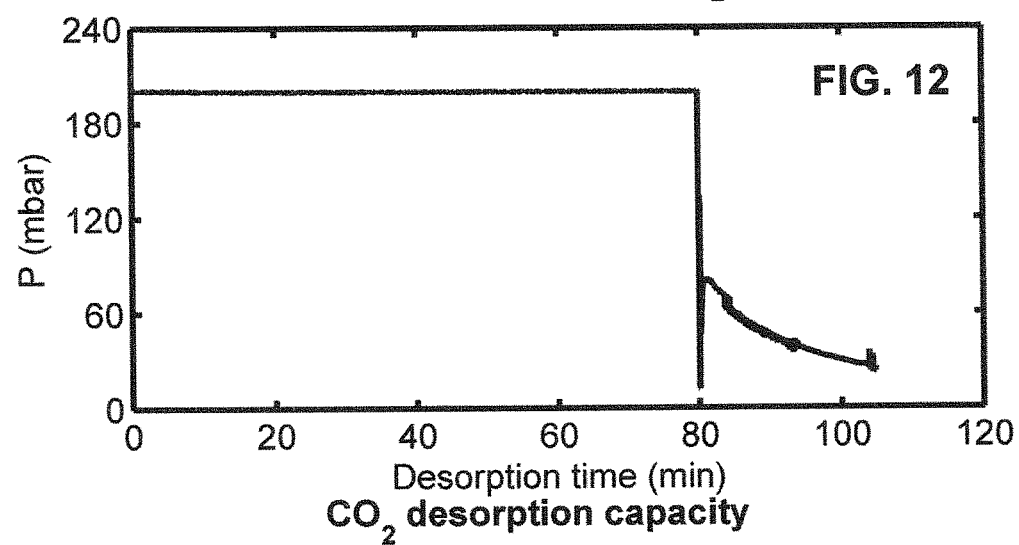
FIG. 12 shows the measured effective CO2 partial pressure in a delayed steam delivery process.
Figure 13:
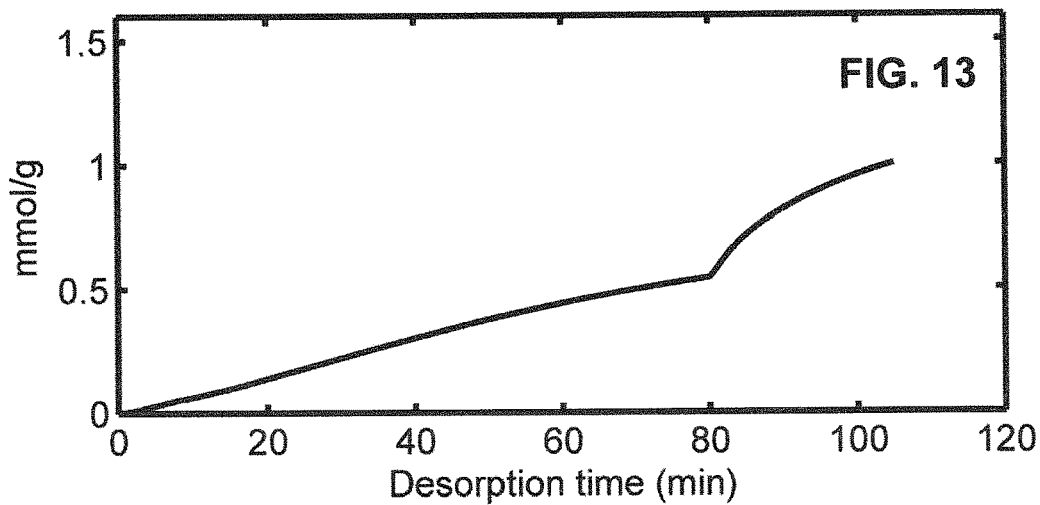
FIG. 13 shows the measured cumulative desorption capacity for a delayed steam delivery process.
Figure 14:
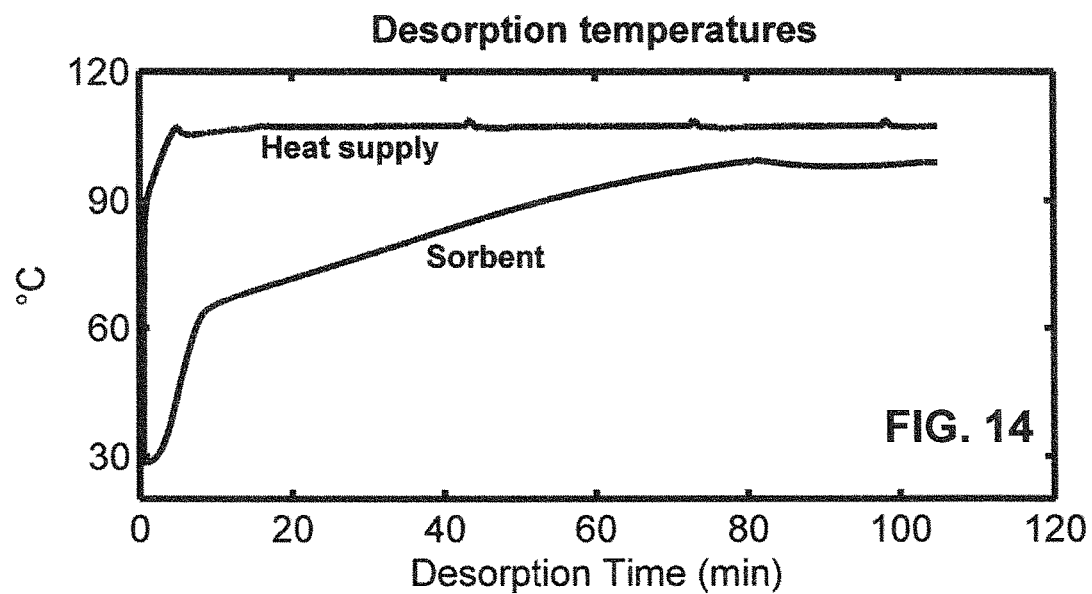
FIG. 14 shows the measured temperature of the heat source and the sorbent in a delayed steam delivery process.

One embodiment of a steam assisted desorption process was investigated for its application to direct air capture of $CO_2$. The process comprised evacuation, temperature swing under vacuum up to the desorption temperature, steam purge under vacuum, cooling and re-pressurization. During the previous adsorption step, 40 g of amine functionalized adsorbent material was loaded with $CO_2$ by flowing ambient atmospheric air with a relative humidity of 60% and a temperature of 30° C. through a vacuum chamber in which the sorbent is held. During the desorption step, the chamber was evacuated to 200 $mbar_{abs}$ and subsequently heated with an external heat source at 110° C. to about 100° C. During this stage (Temperature Swing under Vacuum) a quantity of $CO_2$ is released corresponding to 0.54 mmol/g. Subsequent injection of the steam at a constant flow rate of 2.5 g/h produced a very rapid further desorption of $CO_2$ (FIG. 11) due to the rapid and deep reduction in partial $CO_2$ pressure (FIG. 12) down to 25 $mbar_{abs}$. During the 20 minutes of this Steam Purge under Vacuum stage, an additional 0.45 mmol/g of $CO_2$ were released bringing the total desorption capacity to 1 mmol/g (FIG. 13). The overall dilution of the $CO_2$ with steam at the end capacity measured by the cumulative gas volumes was 3.3:1 moles $H_2O$ to moles $CO_2$. The temperatures of the heat source and the sorbent material are shown in FIG. 14. The sorbent material temperature climbs steadily during stage Temperature Swing under Vacuum. Upon the application of steam in stage Steam Purge under Vacuum, the temperature initially drops due to the rapid desorption and the associated energy demand for the reaction.

Example 3: Effect of Various Steam Flow Rates on One Embodiment

The process of Example 2 was repeated with various steam flow rates, heat source temperatures, desorption pressures and various sorbent materials. The results are summarized in the following Table 1. All experiments were conducted with 40 g of amine functionalized adsorbent.

under Vacuum to achieve an attractive cyclic yield. Increasing the steam flow rate increases the cyclic yield by increasing the $CO_2$ released in stage Steam Purge under Vacuum.

Practically there are certain limitations on these parameters which define the operation of the preferred embodiment. Pumping out the desorbed gas at a vacuum pressure of significantly less than 100 $mbar_{abs}$ can represent increased process cost for DAC applications where not only pump work but also the capital investment for larger volume throughput pumps must be considered. Therefore desorption pressures of significantly less than 100 $mbar_{abs}$ may become economically critical. Conversely, desorption pressures higher than 200 mbar may result in low yields and high steam demands as demonstrated by the results of a 400 mbar desorption pressure experiment. Desorption temperatures as here shown should be as high as possible to achieve the largest release of $CO_2$ in stage temperature swing under vacuum. In the temperature range 95° C.-110° C., the price of heat changes little, making it attractive to work with the highest possible temperature which avoids damage to the amines groups of the adsorbent.

Figure 15:
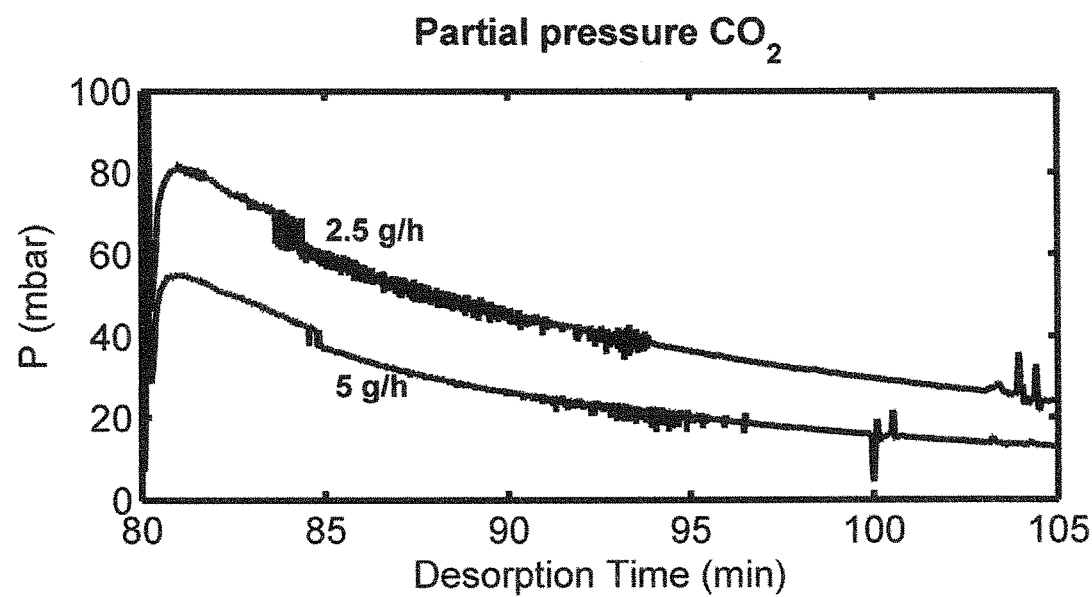
FIG. 15 shows the effective CO2 partial pressure achieved with a purge flow of steam at two flow rates 2.5 g/h and 5 g/h under a vacuum of 200 mbar$_{abs}$.

Currently, typical amine sorbents experience damage above roughly 120° C. Steam flow rates define the size of process equipment for the heat recovery system and the gas and water conduits. In consideration of capital costs for infrastructure such as steam generators, condensers, water handling equipment and piping a molar flow rate of greater than 40:1 steam to $CO_2$ may be economically unfeasible when applied to DAC. Further, reduction in the steam demand further reduces the energy demand and the capital cost of process equipment. FIG. 15 shows the partial $CO_2$ pressure for two desorption processes at 200 $mbar_{abs}$ and 110° C. heat source temperature using 2.5 g/h and 5 g/h steam flows. Although the $CO_2$ partial pressure is roughly halved by increasing the steam flow, it is clear from Table 1 that the capacity in stage Steam Purge under Vacuum and the total capacity show a nearly negligible increase. This is due to the flat and rectangular form the adsorption isotherms of the selected amine functionalized sorbent materials and shows that further increases in capacity can only be brought

TABLE 1

Selected steam assisted desorption experiments

| Desorption Pressure ($mbar_{abs}$) | Heat source temperature/ Sorbent temperature (° C.) | Steam flow rate (g/h) | Stage Temperature Swing under Vacuum Capacity (mmol/g) | Stage Steam Purge under Vacuum Capacity (mmol/g) | Total Capacity (mmol/g) | Dilution at max capacity ($nH_2O$:$nCO_2$) |
|---|---|---|---|---|---|---|
| 400 | 95/88 | 20 | 0.118 | 0.536 | 0.653 | 26:1 |
| 200 | 110/100 | 2.5 | 0.542 | 0.458 | 1.000 | 3.3:1 |
| 200 | 110/100 | 5 | 0.53 | 0.475 | 1.005 | 6.3:1 |
| 200 | 102/96 | 10 | 0.445 | 0.597 | 1.043 | 20:1 |
| 100 | 102/96 | 10 | 0.556 | 0.450 | 1.006 | 6:1 |
| 200 | 95/88 | 5 | 0.359 | 0.490 | 0.815 | 10:1 |
| 200 | 95/88 | 60 | 0.318 | 0.809 | 1.148 | 45:1 |
| 50 | 95/88 | 20 | 0.612 | 0.528 | 1.145 | 25:1 |

A reduction of the desorption pressure at a constant desorption temperature favors the release of $CO_2$ in Temperature Swing under Vacuum as does an increase in the desorption temperature at a constant pressure. An increased release of $CO_2$ in stage Temperature Swing under Vacuum reduces the necessary steam demand of stage Steam Purge about with very significant increases in steam demand—a conclusion which is by no means obvious from the prior art.

With such considerations, one possible attractive and practical operation parameter set for the investigated process was found to consist of 100-115° C. heat source temperature, 150-250 $mbar_{abs}$ desorption pressure and a steam to $CO_2$ molar ratio of less than 8:1 corresponding to less than approx. 0.1-0.2 kg steam/h/kg sorbent. This combination as shown above yields the desired approx. 1 mmol/g in cyclic operation. This parameter set is specific to the selected process parameters and investigated sorbent and is not obvious from the prior art.

The behavior of this process of this invention is substantially superior to a conventional pure steam purge at atmospheric pressure as it is known in the prior art. In particular, the dilution necessary to reach the same cyclic capacity for a pure steam purge is in direct proportion to the partial pressure of $CO_2$. To reach 25 $mbar_{abs}$ $CO_2$ partial pressure as achieved with this process, a pure steam purge process at atmospheric pressure would require 40 moles of steam for each mole of $CO_2$ released. Such a steam demand might not be economically feasible from the viewpoint of energy for steam generation and capital costs for infrastructure such as steam generators, water handling equipment and piping. The process of the preferred embodiment achieves the same $CO_2$ partial pressure with significantly lower steam demand. Secondly, the process of this invention represents a significant improvement over the conventional temperature vacuum swing process due to a doubling in the cyclic capacity. Further, because the low steam demand of the preferred process represents only a small increase in the additional energy which must be supplied for stage Steam Purge under Vacuum, an overall decrease in specific energy demand per ton of $CO_2$ is achieved, compared to a conventional temperature vacuum swing process. A comparison between processes with and without the recovery of the heat of vaporization of steam is given in Example 4.

Example 4: Energy Analysis of Sorbent Regeneration Processes

The possible process of Example 1 was analyzed for energy demand with one possible heat recovery embodiment consisting of a heat pump between steam generation and condensation heat exchangers. For comparison the energy demand is also reported without heat recovery. The energy analysis omits electricity demand of the vacuum system which is typically on the order of 100 kWh per ton CO2. The operation parameters and resulting cyclic capacities determined in Example 2 are used for the analysis along with the physical properties of an amine functionalized adsorbent shown in the following parameter table. The sorbent mass was derived from one possible configuration for the unit.

| Sorbent | |
|---|---|
| Specific heat | 1.4 kJ/kg/K |
| Water cyclic capacity | 3 . . . 8 mmol/g |
| | (40% . . . 80% relative humidity) |
| Heat of $H_2O$ desorption | 47 kJ/mol $H_2O$ |
| Heat of $CO_2$ desorption Process | 70 kJ/mol $CO_2$ |
| Steam dilution ratio in Stage Steam Purge under Vacuum | 3.3:1 mol $H_2O$:mol $CO_2$ |
| Sorbent mass within unit | 700 kg |
| COP Heat Pump | 8 |
| Heat of vaporization of water | 2260 kJ/kg |
| Volume purge ratio for Stage Pre-Purge | 10 |

The total thermal energy, steam and electrical energy demand is shown in the following table for the case of one preferred embodiment with the heat recovery system.

| | With waste heat recovery | Without waste heat recovery |
|---|---|---|
| Cyclic capacity | 1 mmol/g | |
| Steam Mass | 1.0 ton H2O/ton CO2 | |
| Steam flow rate - stage Steam Purge under Vacuum | 64 kg/h | |
| Sensible heat | 619 kWh/ton CO2 | |
| Heat of H2O desorption | 0 | 890 kWh/ton CO2 (@3 mmol H2O/g) 2374 kWh/ton CO2 (@8 mmol H2O/g) |
| Heat of CO2 desorption | 441 kWh/ton CO2 | |
| Heat steam generation | 0 | 628 kWh/ton CO2 |
| Electricity heat pump (COP = 8) | 190 kWh/ton CO2 (@3 mmol H2O/g) 375 kWh/ton CO2 (@8 mmol H2O/g) | 0 |
| Total thermal energy demand | 1060 kWh/ton CO2 (@3 mmol H2O/g) | 2578 kWh/ton CO2 (@3 mmol H2O/g) |
| Total electrical energy demand | 190 kWh/ton CO2 | 0 |

As a comparison, the same analysis was repeated for a pure steam purge desorption process conducted at atmospheric pressure as known in the prior art without recovery of the heat of vaporization with a steam quantity necessary to reach the same effective CO2 partial pressure as the preferred embodiment. The results are shown below:

| | |
|---|---|
| Cyclic capacity | 1 mmol/g |
| Steam Mass | 19.6 ton $H_2O$/ton $CO_2$ |
| Steam flow rate | 1077 kg/h |
| Electricity for heat pump | 0 kWh/ton $CO_2$ |
| Heat for steam production | 12'270 kWh/ton $CO_2$ |
| External heating of sorbent | 0 kWh/ton $CO_2$ |
| Total thermal energy demand | 12'270 kWh/ton $CO_2$ |

It is seen that a pure steam process of the prior art has 5 times higher energy and 17 times higher steam demand than the process of the disclosed invention, inducing high costs. Considering facility demand, with a maximum gas flow speed of 20 m/s in steam piping (which is a typical value used for plant design), the flow rate for the prior art process requires piping with a 170 mm bore (i.e. DN 200) with the correspondingly sized valves and connections. The process of the disclosed invention can use much more economical 45 mm (i.e. DN 50) piping with more readily available and significantly less expensive process equipment.

As a further comparison a conventional temperature vacuum swing process without stage Pre-Heat and stage Pre-Purge is analyzed with a desorption pressure of 200 $mbar_{abs}$ and 110° C. heat source temperature.

| | |
|---|---|
| Cyclic capacity | 0.54 mmol/g |
| Steam Mass | 0 ton $H_2O$/ton $CO_2$ |
| Steam flow rate | 0 kg/h |
| Electricity see above. | 0 kWh/ton $CO_2$ |
| Heat for steam production | 0 kWh/ton $CO_2$ |
| External heating of sorbent | 3543 kWh/ton $CO_2$ |
| Total thermal energy demand | 3543 kWh/ton $CO_2$ |

Clearly the main drawback of this process compared to the preferred embodiment of the process disclosed in this invention is that the cyclic capacity is half that of the preferred embodiment. Correspondingly, the specific energy demand is significantly higher than that of the process of the preferred embodiment.

Example 5: Improvement of Sorbent Lifetime

The process of those embodiments comprising the process stage Pre-Purge strongly reduces exposure of the sorbent to high temperature oxygen which is known to significantly reduce cyclic capacity. Stage Pre-Purge was evaluated experimentally with an amine functionalized adsorbent in a conventional temperature-vacuum swing process. It was found that by pre-purging the sorbent chamber with an inert gas and removing oxygen before beginning the temperature swing, the reduction in cyclic capacity can be reduced by 50%. Fresh sorbent was tested before and after 200 temperature-vacuum swing (TVS) cycles achieving sorbent temperatures of more than 90° C. with and without Pre-Purge. The results are shown in the table below:

| Fresh sorbent purge cyclic capacity | Sorbent purge cyclic capacity after 200 TVS cycles with Pre-Purge. | Sorbent purge cyclic capacity after 200 TVS cycles without Pre-Purge |
|---|---|---|
| 1.27 mmol/g | 1.11 mmol/g | 1.02 mmol/g |

Figure 16:
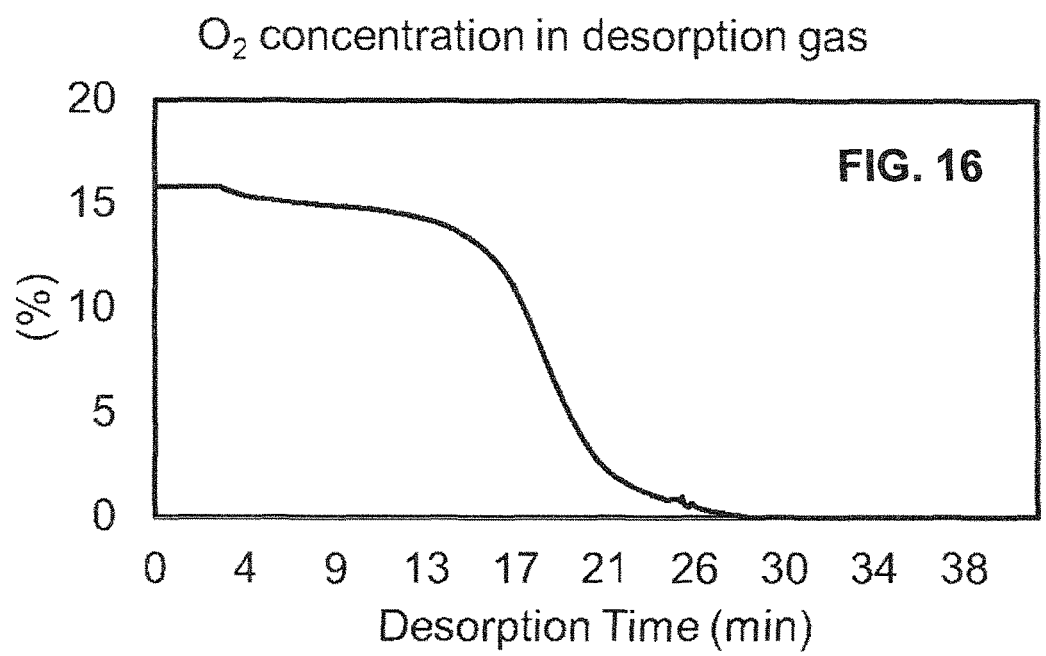
FIG. 16 shows the measured O2 concentration during the desorption of CO2 captured from ambient atmospheric air in a conventional temperature vacuum swing process.
Figure 17:
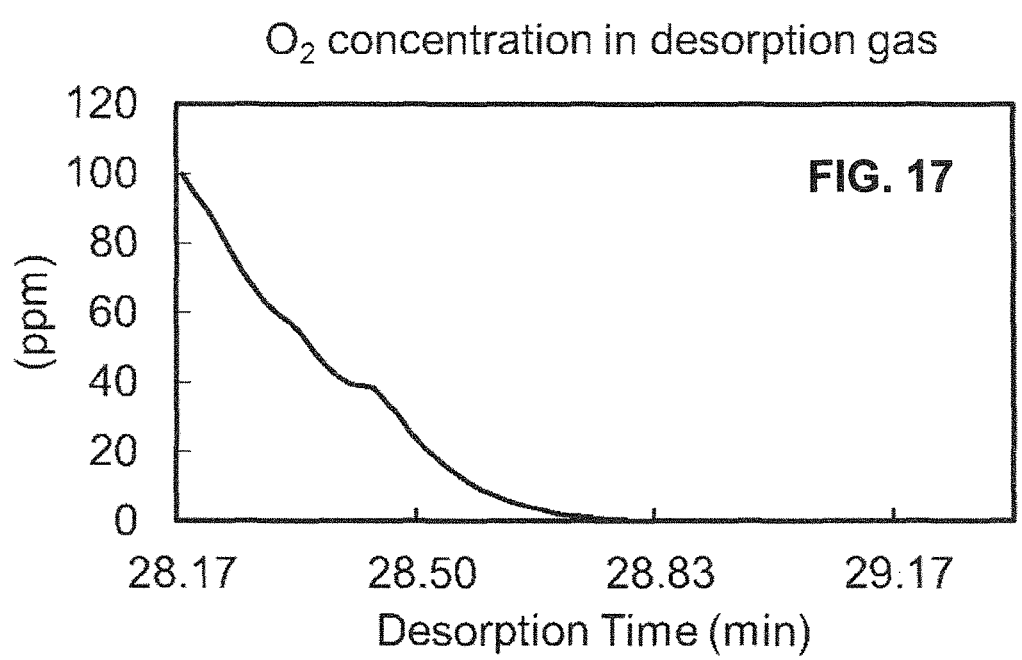
FIG. 17 shows details of the measured O2 concentration during the desorption of CO2 captured from ambient atmospheric air in a conventional temperature vacuum swing process.

FIG. 16 show the oxygen concentration in the desorption gas during a typical temperature vacuum swing desorption of $CO_2$ captured from ambient atmospheric air. The concentration of oxygen in the desorption gas sinks rapidly from a near atmospheric concentration as $CO_2$ gas is released and effectively purges the vacuum chamber of the majority of oxygen achieving a sub 1% concentration roughly 26 minutes after the start of desorption. FIG. 17 shows a zoomed portion of the FIG. 16 focusing on oxygen concentrations below 100 ppm. The oxygen concentration sinks below 1 ppm roughly at 28.7 min after the start of desorption.

LIST OF REFERENCE SIGNS

| | |
|---|---|
| 1 | Unit |
| 1-1, -2, -3 | Units in a sequential arrangement |
| 2 | Adsorber structure heat exchanger |
| 3 | Adsorption valves |
| 4 | Inlet steam |
| 4-1, -2, -3 | Steam flow into various units |
| 5 | Steam generation heat exchanger |
| 6 | Adsorber structure |
| 7 | Desorption gas (gaseous carbon dioxide) |
| 7-1, -2, -3 | Desorption gas (gaseous carbon dioxide) and steam flow of various units |
| 8 | Condensation heat exchanger |
| 9 | Steam flow through adsorber structure |
| 10 | Heat pump |
| 11 | Heat source high temperature |
| 12 | Heat source low temperature |
| 13 | Combined condensation/steam generation heat exchanger |
| 14 | Re-compressor |
| 15 | Kettle re-boiler |
| 16 | High purity carbon dioxide |
| 17 | Liquid water |
| 18 | Vacuum pressure ($mbar_{abs}$) |
| 19 | Oxygen partial pressure ($mbar_{abs}$) |
| 20 | Steam flow (kg/h) |
| 21 | Sorbent temperature (° C.) |
| 22 | Cumulative desorption capacity (mmol/g) |
| Q | General heat flow |
| S1-S7 | Process steps |
| P1, P2, P3 | Various vacuum pressure levels |
| T1, T2, T3 | Various temperature levels |

The invention claimed is:

1. A method for separating gaseous carbon dioxide from a gas mixture containing said gaseous carbon dioxide as well as further gases different from gaseous carbon dioxide by cyclic adsorption/desorption using a sorbent material adsorbing said gaseous carbon dioxide, using a unit containing an adsorber structure with said sorbent material, the unit being evacuable to a vacuum pressure of 400 $mbar_{abs}$ or less, and the adsorber structure being heatable to a temperature of at least 80° C. for the desorption of at least said gaseous carbon dioxide and the unit being openable to flow-through of the gas mixture and for contacting it with the sorbent material for the adsorption step, wherein the method comprises the following sequential and in this sequence repeating steps:

(a) contacting said gas mixture with the sorbent material to allow at least said gaseous carbon dioxide to adsorb on the sorbent material under ambient atmospheric pressure conditions and ambient atmospheric temperature conditions in an adsorption step;

(b) evacuating said unit to a pressure in the range of 20-400 $mbar_{abs}$ and heating said sorbent material in said unit to a temperature in the range of 80-130° C. in a desorption step and extracting at least the desorbed gaseous carbon dioxide from the unit and separating gaseous carbon dioxide from water by condensation in or downstream of the unit;

(c) actively cooling the sorbent material under a pressure of the one in step (b) to a temperature larger or equal to ambient atmospheric temperature and re-pressurisation of the unit to ambient atmospheric pressure conditions;

wherein in step (b) steam is injected into the unit to flow-through and contact the sorbent material under saturated steam or superheated steam conditions with a superheated steam temperature of up to 130° C. at the pressure level in said unit, and wherein the molar ratio of steam that is injected during the entire step (b) to the gaseous carbon dioxide released during the entire step (b) is less than 40:1.

2. The method according to claim 1, wherein step (b) comprises the following sequential steps:

(b1) evacuating said unit to an initial pressure in the range of 20-200 $mbar_{abs}$;

(b2) preheating the sorbent material;

(b3) optionally injecting an initial portion of steam in a pre-purge step;

(b4) further heating the sorbent material to a temperature in the range of 80-130° C. and extracting a first portion of said gaseous carbon dioxide from the unit and separating gaseous carbon dioxide from water by condensation in or downstream of the unit;

(b5) injecting steam into the unit to flow-through and contact the sorbent material under saturated steam or superheated steam conditions with a superheated steam temperature of up to 130° C. at a pressure level in the range of 50-400 $mbar_{abs}$, while continuing to heat the sorbent material to a temperature in the range of 80-130° C. and extracting a second portion of said gaseous carbon dioxide from the unit and separating gaseous carbon dioxide from water by condensation in or downstream of the unit.

3. The method according to claim 2, wherein in step (b2) the sorbent material is heated to a temperature in the range of 45-75° C. using a heat exchanger integrated into the sorbent material, and/or in step (b4) the sorbent material is heated to a temperature in the range of 90-120° C. using a heat exchanger integrated into the sorbent material, and/or wherein step (c) includes active cooling of the adsorber structure to a temperature of less than 60° C.

4. The method according to claim 2, wherein in step (b3) an initial portion of steam is injected in a pre-purge step.

5. The method according to claim 2,
wherein a low-temperature heat source providing heat in the range of 40-80° C. supplies the heat for steam generation in a steam heat exchange or generation unit for use during step (b5) and/or during step (b3), and
wherein a high-temperature heat source providing heat in the range of 80-130° C. supplies the heat used for heating said sorbent material during step (b5).

6. The method according to claim 2,
wherein the molar ratio of steam that is injected during the entire step (b) to the gaseous carbon dioxide released during the entire step (b) is less than 10:1, and/or
wherein the steam used in step (b5) has a saturation pressure in the range of 50-400 $mbar_{abs}$, and a corresponding saturation temperature in the range of 33-76° C.

7. The method according to claim 1,
wherein a plurality of serial individual units is supplied with steam generated by a plurality of steam generation or steam heat exchange units, wherein apart from a most upstream steam generation unit these steam supplies are provided between adjacent individual units, and
wherein steam is provided to a first unit by said most upstream heat exchanger at a first pressure, and the steam downstream of the first unit is, along with extraction of gaseous carbon dioxide originating from the first unit, at least partly condensed downstream of the first unit in a heat exchange and/or steam generation unit thereby providing at least part of the heat for the generation of steam to a subsequent unit at a lower second pressure than said first pressure,
wherein the steam downstream of the subsequent unit is, along with extraction of gaseous carbon dioxide originating from the subsequent unit, at least partly condensed downstream of the subsequent unit in a heat exchange and/or steam generation unit thereby providing at least part of the heat for the generation of steam to a further unit at a lower third pressure than that in the previous unit,
followed by at least partial condensation of the steam downstream of the further unit, along with extraction of gaseous carbon dioxide originating from the further unit, and/or
followed by a serial sequence of further units, each at sequentially lower pressure, and the steam downstream of each unit is, along with extraction of gaseous carbon dioxide originating from the respective unit at least partly condensed downstream of the respective unit in a heat exchange and/or steam generation unit thereby providing at least part of the heat for the generation of steam to a next unit at lower pressure than in the previous unit.

8. The method according to claim 1,
wherein one single heat source is used for providing the heat for the steam generation and the heat for the heating of the sorbent material in step (b) using a heat exchange fluid passing through a heat exchanger element provided in the adsorber structure and a steam heat exchange unit in a parallel flow arrangement or in a serial flow arrangement where in the case of a serial flow arrangement it first passes through the heat exchanger element provided in the adsorber structure and subsequently through the steam heat exchange unit.

9. The method according to claim 1,
wherein steam originating from injected steam and desorbed water from the gas mixture, in a mixture with gaseous carbon dioxide extracted from the unit in step (b), is condensed in a condensation heat exchanger separating the carbon dioxide at least partly from the condensed water.

10. The method according to claim 1,
wherein steam and gaseous carbon dioxide extracted from the unit in step (b) is first compressed in a re-compressor and then passes a kettle re-boiler condensing the steam and separating it from the carbon dioxide and using the released heat for generating steam for use in step (b).

11. The method according to claim 1,
wherein the sorbent material is a weakly basic ion exchange resin, including one with adsorbing amine groups, or is an amine functionalised cellulose.

12. The method according to claim 1,
wherein a heat exchange or steam generation unit is located in the interior space of the unit generating the steam for step (b) within the wall boundaries of the unit to be evacuated and upstream of the sorbent material, and/or
wherein the steam condensation heat exchanger for the condensation of steam and/or separation of gaseous carbon dioxide is located in the interior space of the unit within the wall boundaries of the unit to be evacuated and downstream of the sorbent material.

13. The method according to claim 1,
wherein steam downstream of the unit, condensed or not, is used, if need be after further supply with heat, as steam for step (b) of the same or another unit or for the generation of steam for step (b) of the same or another unit.

14. Use of a method according to claim 1 for the separation of carbon dioxide from an ambient air stream.

15. The method according to claim 1, wherein the gas mixture is air or flue gas.

16. The method according to claim 1, wherein step (b) comprises the following sequential steps:
(b1) evacuating said unit to an initial pressure in the range of 50-150 $mbar_{abs}$, without actively heating or cooling the sorbent material;
(b2) preheating the sorbent material, to a temperature in the range of 45-75° C.;
(b3) optionally injecting an initial portion of steam in a pre-purge step;
(b4) further heating the sorbent material to a temperature in the range of 90-120° C. and extracting a first portion of said gaseous carbon dioxide from the unit and separating gaseous carbon dioxide from water by condensation in or downstream of the unit;
(b5) injecting steam into the unit to flow-through and contact the sorbent material under saturated steam or superheated steam conditions with a superheated steam temperature of up to 130° C. at a pressure level in the range of 100-300 $mbar_{abs}$ while continuing to heat the sorbent material to a temperature in the range of 90-120° C. and extracting a second portion of said gaseous carbon dioxide from the unit and separating gaseous carbon dioxide from water by condensation in or downstream of the unit.

17. The method according to claim 2, wherein within steps (b2) to (b5) the pressure in the unit is allowed to increase with respect to step (b1) and/or is maintained in the range 100-300 mbar$_{abs}$.

18. The method according to claim 2, wherein the heat transfer in steps (b2) and (b4) is effected by a heat exchanger element provided in the adsorber structure, involving a heat exchange fluid circulated through the heat exchanger element.

19. The method according to claim 2, wherein step (c) includes active cooling of the adsorber structure to a temperature of less than 50° C., effected by a heat exchanger element provided in the adsorber structure, involving a heat exchange fluid circulated through the heat exchanger element.

20. The method according to claim 2,
wherein in step (b3) an initial portion of steam is injected in a pre-purge step,
wherein in this pre-purge step (b3) the steam injected is characterized by a saturation temperature in the range of 33-58° C., corresponding to a saturation pressure range of 50-150 mbar$_{abs}$.

21. The method according to claim 2,
wherein in step (b3) an initial portion of steam is injected in a pre-purge step, wherein the total injected steam volume in the pre-purge step (b3), at the pressure prevailing in the unit, corresponds to less than 10 times the volume of the desorption chamber of the unit and/or
wherein the molar ratio of steam that is injected during the pre-purge step (b3) to the gaseous carbon dioxide released during the entire step (b) is less than 0.5:1.

22. The method according to claim 2,
wherein a low-temperature heat source providing heat in the range of 45-75° C. supplies the heat for steam generation in a steam heat exchange or generation unit for use during step (b5) and/or during step (b3), and
wherein said low-temperature heat source also supplies the heat for pre-heating of said sorbent material during step (b2), and
wherein a high-temperature heat source providing heat in the range of 90-120° C. supplies the heat used for heating said sorbent material during step (b5).

23. The method according to claim 2,
wherein the molar ratio of steam that is injected during the entire step (b) to the gaseous carbon dioxide released during the entire step (b) is less than 10:1, and
wherein the pressure in steps (b3)-(b5), is in the range of 100-300 mbar$_{abs}$ and
wherein the temperature in steps (b2) and (b3) is increased to a value in the range 45-75° C. and wherein the temperature in steps (b4) and (b5) is increased to a value in the range 90-120° C., and/or
wherein the steam used in step (b5) has a saturation pressure in the range of 100-300 mbar$_{abs}$ and a corresponding saturation temperature in the range of 45-69° C.

24. The method according to claim 7, wherein the sequence is followed by a serial sequence of further units, each at sequentially lower pressure, and the steam downstream of each unit is, along with extraction of gaseous carbon dioxide originating from the respective unit at least partly condensed downstream of the respective unit in a heat exchange and/or steam generation unit thereby providing at least part of the heat for the generation of steam to a next unit at lower pressure than in the previous unit.

25. The method according to claim 2,
wherein steam originating from injected steam and desorbed water from the gas mixture, in a mixture with gaseous carbon dioxide extracted from the unit in step (b), (b2), (b3), (b4) and (b5) is condensed in a condensation heat exchanger separating the carbon dioxide at least partly from the condensed water, and
wherein the condensation heat generated in the condensation heat exchanger is used, if need be after further increase of the temperature by means of a heat pump, for generation of steam for use in step (b) for the same unit or for other units and/or for heating of other units through heat exchanger elements provided in their adsorber structures, during step (b2).

26. The method according to claim 3, wherein in step (b3) an initial portion of steam is injected in a pre-purge step.

27. The method according to claim 3,
wherein a low-temperature heat source providing heat in the range of 40-80° C. supplies the heat for steam generation in a steam heat exchange or generation unit for use during step (b5) and/or during step (b3), and
wherein a high-temperature heat source providing heat in the range of 80-130° C. supplies the heat used for heating said sorbent material during step (b5).

* * * * *